(12) United States Patent
Seki et al.

(10) Patent No.: US 10,788,820 B2
(45) Date of Patent: Sep. 29, 2020

(54) PLANT STATE DISPLAYING APPARATUS, PLANT STATE DISPLAYING SYSTEM, AND METHOD OF DISPLAYING PLANT STATE

(71) Applicant: YOKOGAWA ELECTRIC CORPORATION, Tokyo (JP)

(72) Inventors: Tatenobu Seki, Tokyo (JP); Mitsuhiro Yamamoto, Tokyo (JP); Yoshihisa Hidaka, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 353 days.

(21) Appl. No.: 15/703,341

(22) Filed: Sep. 13, 2017

(65) Prior Publication Data

US 2018/0081350 A1 Mar. 22, 2018

(30) Foreign Application Priority Data

Sep. 16, 2016 (JP) .................................. 2016-182182

(51) Int. Cl.
*G06F 11/30* (2006.01)
*G21C 17/00* (2006.01)
*G05B 23/02* (2006.01)

(52) U.S. Cl.
CPC ..... *G05B 23/0272* (2013.01); *G05B 23/0205* (2013.01); *G05B 23/027* (2013.01); *G05B 23/0221* (2013.01); *G05B 23/0267* (2013.01); *G05B 2219/24177* (2013.01)

(58) Field of Classification Search
CPC ............ G05B 23/0272; G05B 23/0205; G05B 23/0221; G05B 23/0267; G05B 23/027

USPC .......................................................... 702/183
See application file for complete search history.

(56) References Cited

U.S. PATENT DOCUMENTS

| 5,790,424 A | 8/1998 | Sugihara et al. |
| 2002/0055790 A1 | 5/2002 | Havekost |
| 2002/0177907 A1 | 11/2002 | Hand et al. |
| 2007/0005266 A1 | 1/2007 | Blevins et al. |
| 2007/0174225 A1 | 7/2007 | Blevins et al. |
| 2013/0123951 A1 | 5/2013 | Daily et al. |
| 2013/0325158 A1 | 12/2013 | Kobayashi et al. |
| 2017/0200294 A1 | 7/2017 | Hirano |
| 2017/0307465 A1 | 10/2017 | Yokono |

(Continued)

FOREIGN PATENT DOCUMENTS

| CN | 1118486 A | 3/1996 |
| CN | 106796156 A | 5/2017 |

(Continued)

*Primary Examiner* — Michael P Nghiem
(74) *Attorney, Agent, or Firm* — Osha Liang LLP

(57) ABSTRACT

A plant state displaying apparatus displaying information representing a state of a plant includes a generator that: acquires plant information from at least one of devices, apparatuses, and facilities installed in the plant; calculates a state value representing the state of the plant using the plant information; and generates a plant state diagram in which at least one of a color and a density of at least one of devices, apparatuses, and facilities from which the plant information is acquired is changed according to magnitude of the state value; and a display that displays the plant state diagram generated by the generator as the information representing the state of the plant.

27 Claims, 14 Drawing Sheets

(56) References Cited

U.S. PATENT DOCUMENTS

2019/0086909 A1* 3/2019 Matsubara ......... G05B 23/0235
2019/0265688 A1* 8/2019 Shahroudi .......... G05B 23/0275

FOREIGN PATENT DOCUMENTS

| | | | | |
|---|---|---|---|---|
| CN | 106951201 A | 7/2017 | | |
| DE | 10 2007 029930 A1 | 1/2009 | | |
| DE | 10 2012 217 556 A1 | 3/2014 | | |
| EP | 3296830 A1 * | 3/2018 | ......... | G05B 23/0221 |
| FR | 2 918 469 A1 | 1/2009 | | |
| JP | S61-148324 A | 7/1986 | | |
| JP | S63-027903 A | 2/1988 | | |
| JP | H08-261886 A | 10/1996 | | |
| JP | H10-171531 A | 6/1998 | | |
| JP | H11-327628 A | 11/1999 | | |
| JP | 2000-259243 A | 9/2000 | | |
| JP | 2000259236 * | 9/2000 | | |
| JP | 2003-216233 A | 7/2003 | | |
| JP | 5088206 B2 | 12/2012 | | |
| JP | 5868784 B2 | 2/2016 | | |
| WO | WO-2009004471 A1 * | 1/2009 | ......... | G05B 19/4184 |
| WO | WO-2014048641 A1 * | 4/2014 | ......... | G05B 23/0272 |

* cited by examiner

PLANT STATE DISPLAYING APPARATUS, PLANT STATE DISPLAYING SYSTEM, AND METHOD OF DISPLAYING PLANT STATE

FIELD OF THE INVENTION

The present invention relates to a plant state displaying apparatus, a plant state displaying system, and a method of displaying a plant state.

The present application claims priority based on Japanese patent application 2016-182182, filed on Sep. 16, 2016 and includes herein by reference the content thereof.

BACKGROUND

At sites such as plants or factories, various kinds of devices, apparatuses and facilities are installed and operated together. While the number of devices and the like installed at a plant mostly increases or decreases according to the scale of the plant, it is difficult to monitor many installed devices in a large-scale plant. Since a plant is used over a long period (for example, 30 years or more), it is necessary to maintain the performance of the plant for a long period by appropriately performing maintenance of the devices and the like installed to the plant.

In order to appropriately monitor and maintain the devices and the like installed at the plant, it is necessary to accurately perceive the state of the plant. The reason for this is that, when degraded parts of a plant and the influence on degradation of the performance of a plant are not perceived, countermeasures (for example, repair or alteration) for maintaining the performance of the plant cannot be appropriately performed. However, since the degradation of a plant mostly progresses slowly in time, it is frequently difficult to accurately perceive the state of the plant.

In Japanese Patent No. 5088206 (hereinafter, referred to as "Patent Document 1") and Japanese Patent No. 5868784 (hereinafter, referred to as "Patent Document 2"), related technologies for displaying information representing the state of a plant in order to support workers at the site of the plant or operators of the plant are disclosed. Particularly, in Patent Document 1, a technology for two-dimensionally displaying a relation between the operation efficiency of a pump and a degradation state of the pump on a monitor is disclosed. In addition, in Patent Document 2, a technology acquiring the trend of a change in a state quantity in an industrial process based on time series data acquired from a field device, determining presence/absence of a sign of a change in the state of a plant, and giving a notification of a result of the determination is disclosed.

According to the technology disclosed in Patent Document 1 described above, information (for example, a two-dimensional graph representing a relation between the operation efficiency of a pump and the degradation state of the pump) representing degradation states of devices installed to a plant is individually displayed. For this reason, according to the technology disclosed in Patent Document 1 described above, it seems that it is difficult to display information representing degradation states of a plurality of devices installed at a plant in a form enabling perception of the degradation states at a glance.

In addition, according to the technology disclosed in Patent Document 2 described above, information (information representing a change trend of a state quantity) of a plurality of devices can be displayed once, and the information is displayed using symbols (arrows) and characters. When the number of the devices is not large, the symbols and the like can be displayed in large sizes, and thus, the change trend of the state quantity can be perceived at a glance. However, as the number of devices increases, the symbols and the like are displayed in smaller sizes, and thus, it is difficult to perceive the change trend of the state quantity at a glance. In addition, according to the technology disclosed in Patent Document 2 described above, basically, information that is acquired from a device having a sensor is represented, and information of a part having no sensor (for example, a piping part) cannot be represented.

In this way, according to the technologies disclosed in Patent Documents 1 and 2 described above, for example, there are some cases in which it is difficult to perform display of the state of an arbitrary range of a plant in a form enabling accurate perception of the state in a short time such as display of the state of a plant over the whole system of the plant in a form enabling perception of the state of the plant at a glance. When the state of a plant can be accurately perceived at a glance, before the generation of an alarm, appropriate countermeasures for maintaining the performance of the plant can be appropriately performed through a prediction, and accordingly, the display in the form described above is considered to be very important.

SUMMARY

One or more embodiments of the present invention provide a plant state displaying apparatus, a plant state displaying system, and a method of displaying a plant state capable of displaying a state of an arbitrary range of a plant in a form enabling accurate perception of the state in a short time.

A plant state displaying apparatus displaying information representing a state of a plant according to one or more embodiments of the present invention may include a generator configured to acquire plant information from at least one of devices, apparatuses, and facilities installed in the plant, calculate a state value representing the state of the plant using the plant information, and generate a plant state diagram in which at least one of a color and a density of at least one of devices, apparatuses, and facilities from which the plant information is acquired is changed according to magnitude of the state value, and a display configured to display the plant state diagram generated by the generator as the information representing the state of the plant.

The above-described plant state displaying apparatus may further include a setter configured to set a display condition for displaying the plant state diagram on the display. The generator may be configured to generate the plant state diagram according to the display condition set by the setter.

In the above-described plant state displaying apparatus, the setter may be configured to set a range of the plant state diagram to be displayed on the display as the display condition.

In the above-described plant state displaying apparatus, the setter may be configured to set at least one of a first condition, a second condition, and a third condition in the plant state diagram. The first condition defines a type of the at least one of devices, apparatuses, and facilities represented with the at least one of a color and a density changed, the second condition defines a degree of importance of the at least one of devices, apparatuses, and facilities represented with the at least one of a color and a density changed, and the third condition defines a degree of degradation of the at least one of devices, apparatuses, and facilities represented with the at least one of a color and a density changed.

The above-described plant state displaying apparatus may further include a difference calculator configured to calculate a difference between the plant information acquired through a network and a reference value as the state value.

The above-described plant state displaying apparatus may further include a degradation calculator configured to calculate a degree of degradation of the at least one of devices, apparatuses, and facilities installed in the plant as the state value using the plant information acquired through a network.

The above-described plant state displaying apparatus may further include a simulator configured to simulate the plant. The degradation calculator may be configured to calculate a degree of degradation of the at least one of devices, apparatuses, and facilities installed in the plant using a result of the simulation performed by the simulator.

The above-described plant state displaying apparatus may further include a storage. The generator may be configured to store the generated plant state diagram in the storage together with time information representing generation time, read the plant state diagram stored in the storage based on instructions from an outside, and display the read plant state diagram on the display based on the time information.

In the above-described plant state displaying apparatus, the generator may be configured to perform animation display of the plant state diagrams read from the storage on the display in order of a time series.

In the above-described plant state displaying apparatus, the generator may be configured to display a plant state diagram represented with at least one of the color and the density of the at least one of devices, apparatuses, and facilities from which the plant information is acquired being changed according to magnitude of a numerical value calculated using the state value within a predetermined period.

In the above-described plant state displaying apparatus, the generator may be configured to generate the plant state diagram in which information representing an operation range of a worker operating in the plant is superimposed on a diagram representing the plant.

A plant state displaying system displaying information representing a state of a plant according to another aspect of the present invention may include a server apparatus configured to acquire plant information from at least one of devices, apparatuses, and facilities installed in the plant, calculate a state value representing the state of the plant using the plant information, and generate a plant state diagram in which at least one of a color and a density of at least one of devices, apparatuses, and facilities from which the plant information is acquired is changed according to magnitude of the state value, and a display device configured to be connected to the server apparatus through a network and display the plant state diagram generated by the server apparatus as the information representing the state of the plant.

A plant state displaying method displaying information representing a state of a plant according to one or more embodiments of the present invention may include acquiring plant information from at least one of devices, apparatuses, and facilities installed in the plant, calculating a state value representing the state of the plant using the plant information, generating a plant state diagram in which at least one of a color and a density of at least one of devices, apparatuses, and facilities from which the plant information is acquired is changed according to magnitude of the state value, and displaying the generated plant state diagram as the information representing the state of the plant.

The above-described plant state displaying method may further include setting a display condition for displaying the plant state diagram. Generating the plant state diagram may include generating the plant state diagram according to the display condition set.

In the above-described plant state displaying method, setting the display condition may include setting a range of the plant state diagram to be displayed as the display condition.

In the above-described plant state displaying method, setting the display condition may include setting at least one of a first condition, a second condition, and a third condition in the plant state diagram, the first condition defines a type of the at least one of devices, apparatuses, and facilities represented with the at least one of a color and a density changed, the second condition defines a degree of importance of the at least one of devices, apparatuses, and facilities represented with the at least one of a color and a density changed, and the third condition defines a degree of degradation of the at least one of devices, apparatuses, and facilities represented with the at least one of a color and a density changed.

In the above-described plant state displaying method, the state value may be calculated as a difference between the plant information acquired through a network and a reference value.

In the above-described plant state displaying method, calculating the state value may include calculating a degree of degradation of the at least one of devices, apparatuses, and facilities installed in the plant as the state value using the plant information acquired through a network.

The above-described plant state displaying method may further include simulating the plant. Calculating the degree of degradation may include a degree of degradation of the at least one of devices, apparatuses, and facilities installed in the plant using a result of the simulation.

The above-described plant state displaying method may further include storing the generated plant state diagram in a storage together with time information representing generation time. Displaying the generated plant state diagram may include reading the plant state diagram stored in the storage based on instructions from an outside and displaying the read plant state diagram based on the time information.

According to one or more embodiments of the present invention, a plant state diagram represented with at least one of a color and a density of at least one of devices, apparatuses, and facilities from which plant information is acquired being changed according to magnitude of a state value representing a state of a plant acquired by using plant information acquired from at least one of devices, apparatuses, and facilities installed in the plant, and accordingly, the state of an arbitrary range of the plant can be displayed in a form enabling accurate perception in a short time.

DETAILED DESCRIPTION

Hereinafter, a plant state displaying apparatus, a plant state displaying system, and a method of displaying a plant state according to one or more embodiments of the present invention will be described with reference to the drawings.
<Process Control System>

Figure 1:
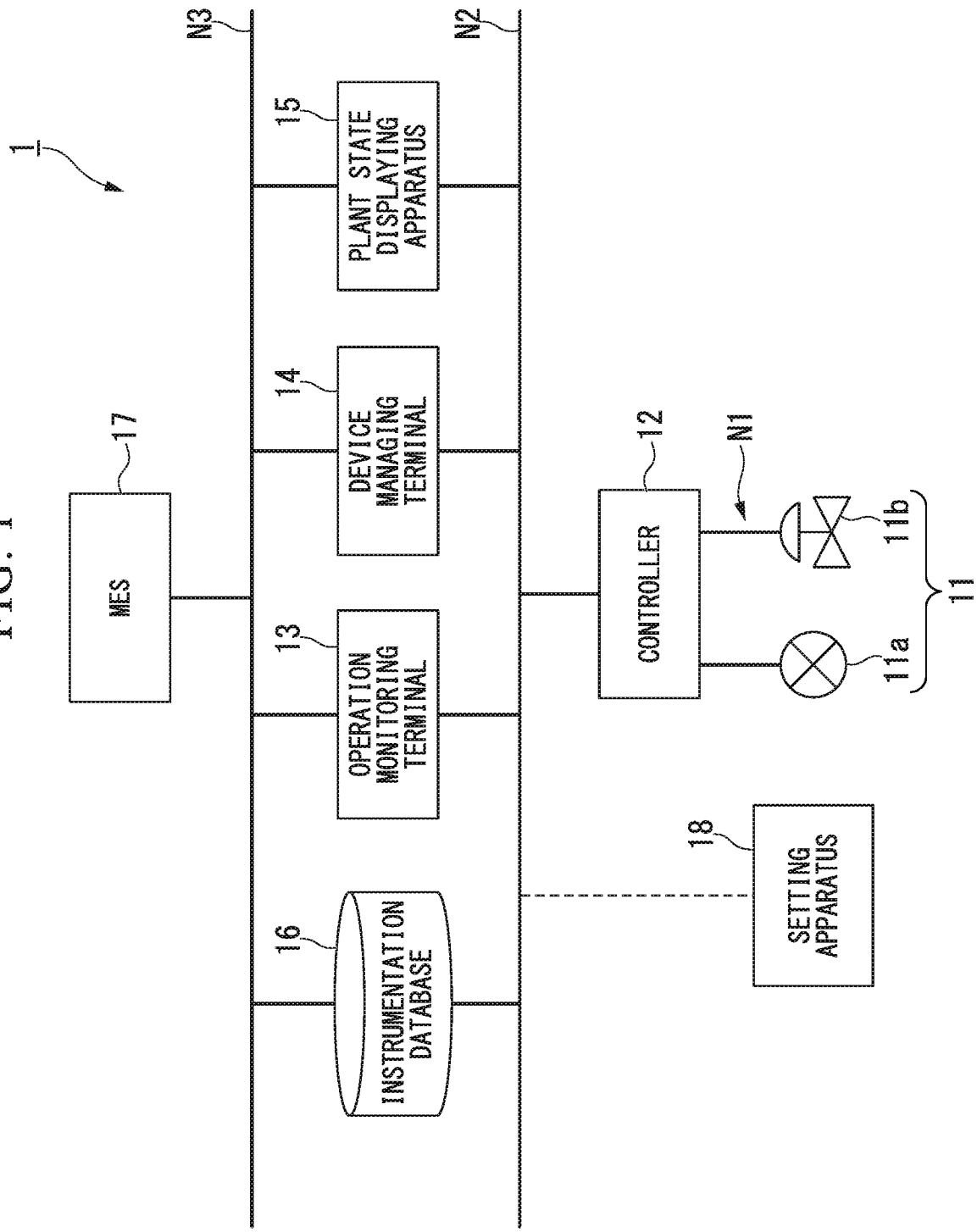
FIG. 1 is a block diagram showing the whole configuration of a process control system according to one or more embodiments of the present invention.

FIG. 1 is a block diagram showing the whole configuration of a process control system according to one or more embodiments of the present invention. As shown in FIG. 1, the process control system 1 includes a field device 11, a controller 12, an operation monitoring terminal 13, a device managing terminal 14, a plant state displaying apparatus 15, an instrumentation database 16, and a manufacturing execution system (MES) 17. Process control is performed as the controller 12 controls the field device 11 under the management of the MES 17. A setting apparatus 18 shown in the drawing performs various settings for devices (for example, the field device 11) disposed in the process control system 1.

Such a process control system 1 is built in a plant, a factory, or the like (hereinafter, it will be simply referred to as a "plant" in a case where these are collectively referred to). Examples of the plant described above include a plant managing and controlling a well site such as a gas field or an oil field and the periphery thereof, a plant managing and controlling power generation of hydraulic power, chemical power, or nuclear power, or the like, a plant managing and controlling environmental power generation of sunlight, wind power, or the like, and a plant managing and controlling water supply and sewerage, a dam, and the like in addition to an industrial plant of chemicals or the like.

As shown in FIG. 1, a field network N1, a control network N2, and an information network N3 are disposed in the process control system 1. The field network N1, for example, is laid at a site of a plant, and the field device 11 and the controller 12 are connected to the field network N1. The field network N1 may be omitted, and the field device 11 and the controller 12 may be connected through a transmission line.

The control network N2 connects, for example, a site of a plant and a monitoring room, and the controller 12, the operation monitoring terminal 13, the device managing terminal 14, the plant state displaying apparatus 15, and the instrumentation database 16 are connected to the control network N2. The setting apparatus 18 may be connected to the control network N2. The information network N3, for example, is laid in the monitoring room of the plant, and the operation monitoring terminal 13, the device managing terminal 14, the plant state displaying apparatus 15, the instrumentation database 16, and the MES 17 are connected to the information network N3.

The field device 11 includes, for example, a sensor device such as a flowmeter or a temperature sensor, a valve device such as a flow control valve or a switching valve, an actuator device such as a fan or a motor, and any other device installed at a site of the plant. In the present example, for easy understanding, a case in which a state quantity in a process to be controlled is the flow rate of a fluid will be described as an example. For this reason, in FIG. 1, one sensor device 11a measuring the flow rate of the fluid and one valve device 11b controlling (operating) the flow rate of the fluid are shown among a plurality of field devices 11 installed in the plant.

The controller 12 communicates with the field device 11 in accordance with instructions from the operation monitoring terminal 13 or the like, thereby controlling the field device 11. Particularly, the controller 12 acquires a process value measured by a certain field device 11 (for example, the sensor device 11a), calculates an operation amount of another field device 11 (for example, the valve device 11b), and transmits the calculated operation amount, thereby controlling another field device 11 (for example, the valve device 11b).

The operation monitoring terminal 13 is operated, for example, by operators of the plant and is used for monitoring a process. Particularly, the operation monitoring terminal 13 acquires input/output data of the field device 11 from the controller 12, conveys the behaviors of the field device 11 and the controller 12 included in the process control system 1 to an operator, and controls the controller 12 based on an operator's instructions.

The device managing terminal 14 is used for generating information for managing various devices (for example, the field device 11 and the controller 12) disposed in the plant based on design information (design information of the plant including the process control system 1) stored in the instrumentation database 16. The information generated by the device managing terminal 14 is, for example, received (downloaded) by the setting apparatus 18 and is set in the field device 11 by the setting apparatus 18.

The plant state displaying apparatus 15 is used for displaying information representing a plant state. This plant state displaying apparatus 15 is arranged for enabling accurate perception of the state of an arbitrary range of the plant in a short time. The plant state displaying apparatus 15, for example, can display a plant state in a form enabling perception of the plant state over the whole system of the plant at a glance and can display only a part of the states of the plant in a form enabling perception of the part of the states at a glance.

The plant state displaying apparatus 15 can be regarded as an apparatus displaying states of all the devices (including the field device 11), apparatuses, or facilities (hereinafter, simply referred to as a "device" when these are collectively referred to) installed in the plant or the states of some of the devices installed in the plant in a form enabling perception of the states at a glance. Details of the plant state displaying apparatus 15 will be described later.

The instrumentation database 16 stores the design information referred to by the device managing terminal 14. In addition, the instrumentation database 16 stores a plant diagram (a diagram showing at least one of devices, apparatuses, and facilities installed in the plant) that becomes a basis of a plant state diagram (details thereof will be described later) displayed in the plant state displaying apparatus 15. For example, the instrumentation database 16 stores a piping and instrument diagram (P&ID), a process flow diagram (PFD), a piping arrangement diagram, a photograph, and the like as the plant diagrams described above.

The MES 17 manages a plant based on management information of the plant input from the outside. Particularly, the MES 17 generates information (production information) used for producing products by operating the plant based on the management information and outputs the generated production information to the controller 12 and the like. In addition, the MES 17 acquires operation information representing the operation status of the plant from the controller 12 or the like and manages a production result of products.

<Plant State Displaying Apparatus>

Figure 2:
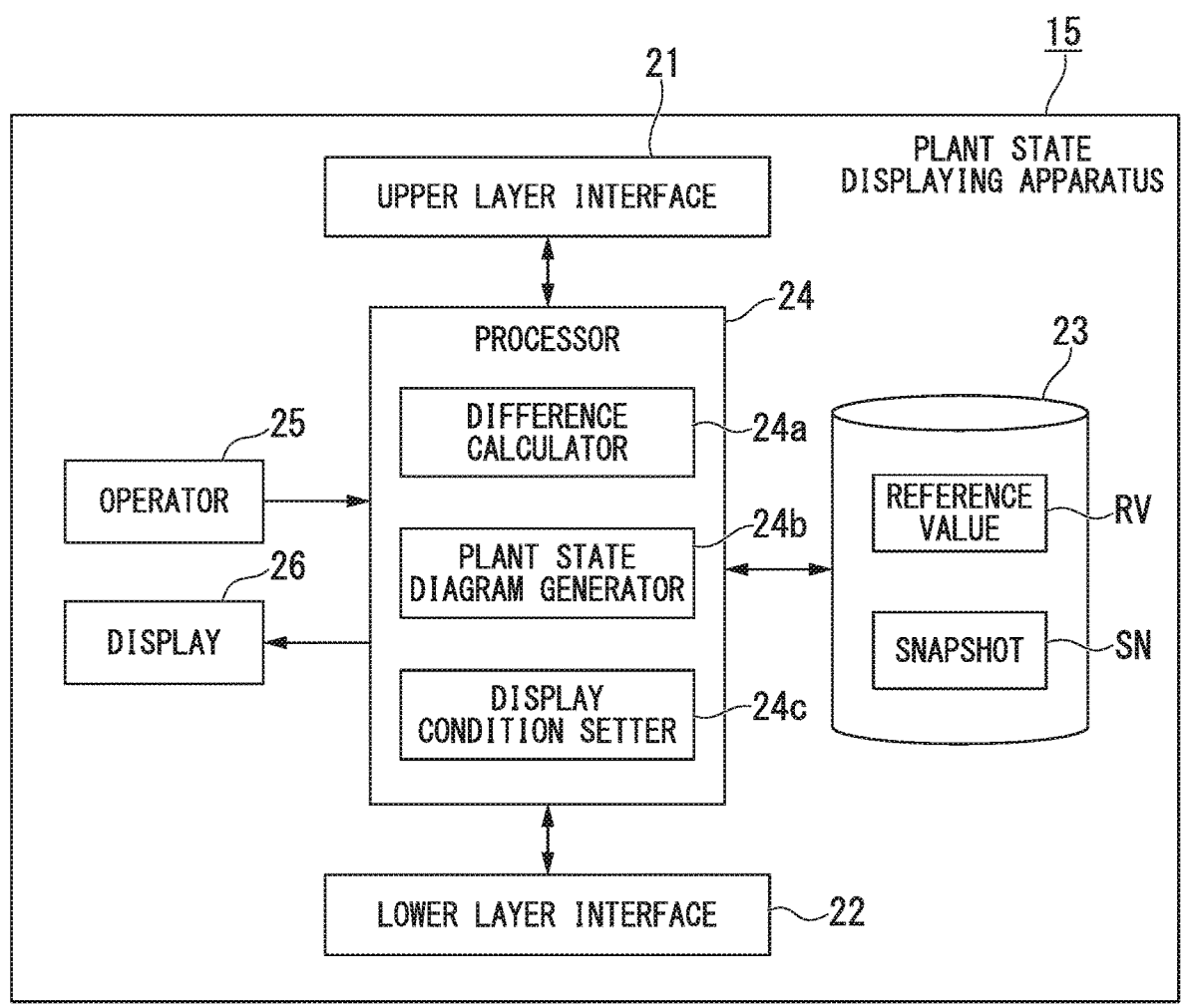
FIG. 2 is a block diagram showing the main configuration of a plant state displaying apparatus according to one or more embodiments of the present invention.

FIG. 2 is a block diagram showing the main configuration of a plant state displaying apparatus according to one or more embodiments of the present invention. As shown in FIG. 2, the plant state displaying apparatus 15 according to one or more embodiments of the present invention includes an upper layer interface 21, a lower layer interface 22, a storage 23, a processor 24, an operator 25, and a display 26. Such a plant state displaying apparatus 15, for example, is realized by a computer of a desktop type, a notebook type, or a tablet type or a workstation.

The upper layer interface 21 is connected to the information network N3 and transmits various kinds of information to the MES 17 and receives various kinds of information from the MES 17. In a case in which the plant state displaying apparatus 15 does not need to be connected to the information network N3, the upper layer interface 21 may be omitted. The lower layer interface 22 is connected to the control network N2 and transmits various kinds of information to the controller 12, the operation monitoring terminal 13, and the instrumentation database 16 and receives various kinds of information from the controller 12, the operation monitoring terminal 13, and the instrumentation database 16. For example, the lower layer interface 22 acquires a process value measured by the field device 11 from the controller 12 or the operation monitoring terminal 13 and acquires the plant diagram described above from the instrumentation database 16.

The storage 23 includes, for example, an external storage device such as a hard disk drive (HDD) or a solid state drive (SSD) and stores various kinds of information used by the plant state displaying apparatus 15 under the control of the processor 24. The storage 23, for example, as shown in FIG. 2, stores reference values RV relating to devices installed in the plant and snapshots SN of a plant state diagram (details thereof will be described later) displayed in the plant state displaying apparatus 15.

A reference value RV defines a reference state of a device installed in the plant. As this reference value RV, an actually measured value measured at an arbitrary time point in the past, a predicted value based on a result of a simulation or the like, or a value combining these (the actually measured value of the past, and the predicted value of the future) may be used. For example, for the sensor device 11a, a process value acquired at a certain time point, a response time (settling time) of a sensor that is actually measured at a certain time point, or the like may be used as the reference value RV. In addition, a plurality of reference values RV may be prepared according to various conditions (for example, a production target product, a production load, the weather, or the like). In addition, in order to allow easy search for the conditions described above, the reference value RV may be stored in the storage 23 with additional information (for example, a keyword, a comment, time, or the like) added thereto.

The snapshot SN is acquired by cutting out the plant state diagram (details thereof will be described later) displayed in the plant state displaying apparatus 15, for example, displayed at a time point when instructions are input from the operator 25. In order to allow easy handling of the snapshot SN and achieve effective use of the snapshot SN, the snapshot SN may be stored in the storage 23 with additional information (for example, time when the snapshot SN is generated or the like) added thereto.

The processor 24 includes a difference calculator 24a, a plant state diagram generator 24b (generator), and a display condition setter 24c (setter) and performs various processes for displaying the plant state diagram in the plant state displaying apparatus 15. In addition, the processor 24 performs communication control through the upper layer interface 21 and the lower layer interface 22, write control and read control of various kinds of information for the storage 23, input control for the operator 25, and display control for the display 26 for displaying a plant state diagram.

The difference calculator 24a calculates a difference (state value) between various kinds of information (plant information) acquired from the devices installed in the plant and a reference value RV stored in the storage 23. For example, the difference calculator 24a calculates a difference between a current value of a process value acquired from the field device 11 through the controller 12 and the control network N2 and a reference value RV stored in the storage 23. The difference calculated by the difference calculator 24a represents a plant state change (a state change from a reference state of a device installed in the plant).

The plant state diagram generator 24b generates a plant state diagram based on the magnitude of the difference calculated by the difference calculator 24a. The plant state diagram represents a device installed in the plant. In the plant state diagram, at least one (gray scale) of a color and a density of the device, from which plant information is acquired, is changed in accordance with the magnitude of the difference between the plant information acquired from a device installed in the plant and the reference value RV.

This plant state diagram can also be regarded as a diagram in which at least one of the color and the density of the device represented in the plant diagram (a diagram representing a device installed to the plant) is changed according to the magnitude of the difference calculated by the difference calculator 24a. The plant state diagram in which the color of the device represented in the plant diagram is changed according to the magnitude of a difference calculated by the difference calculator 24a can be regarded as a heat map acquired by classifying and visualizing plant state changes by using colors.

The plant state diagram generator 24b generates a plant state diagram according to a display condition set by the display condition setter 24c. In addition, the plant state diagram generator 24b generates a snapshot SN acquired by cutting out the plant state diagram displayed in the plant state displaying apparatus 15 that is displayed at a time point when instructions are input from the operator 25 and stores the generated snapshot SN in the storage 23. At this time, the plant state diagram generator 24b stores the snapshot SN in the storage 23, for example, with additional information representing time when the snapshot SN is generated or the like added thereto.

In addition, the plant state diagram generator 24b, for example, based on instructions from the operator 25, reads the snapshot SN from the storage 23 and displays the read snapshot SN on the display 26. As the plant state diagram generator 24b displays the snapshot SN stored in the storage 23 on the display 26, for example, a plant state of the current time point (a time point at which the snapshot SN is displayed) and a plant state of a past time point (a time point at which the snapshot SN is generated) can be compared with each other.

In addition, the plant state diagram generator 24b can display the snapshots SN stored in the storage 23 in order of time series to perform animation display of past changes in the plant state. Alternatively, in order to allow an easy comparison of snapshots SN, the plant state diagram generator 24b may display the snapshots SN stored in the storage 23 to be aligned. In addition, the animation display described above will be described later.

The display condition setter 24c sets a display condition in which the plant state diagram is displayed on the display 26, for example, based on the content of an operation for the operator 25. This display condition setter 24c can set the range of the plant state diagram to be displayed on the display 26 as the display condition described above. For example, the display condition setter 24c can set a display condition such as display of a plant state diagram representing the whole plant, display of a plant state diagram representing only a part of the plant, or the like.

In addition, the display condition setter 24c can set not only the display range described above but also a condition (filtering condition) defining a device to be represented with at least one of the color and the density changed in the plant state diagram as the display condition described above. Examples of this condition include the followings.
(1) Type of device (first condition)
(2) Degree of importance of device (second condition)
(3) Degree of degradation of device (third condition)
(4) Elapsed time since previous maintenance time of device By arranging the display condition setter 24c capable of setting such a display condition, a plant state diagram allowing accurate perception of the state of an arbitrary device in an arbitrary range of the plant in a short time can be displayed. In addition, a plant state diagram according to the viewpoint of a user (for example, a worker or an operator) using the plant state displaying apparatus 15 can be displayed. The degree of importance of a device described above may be set in consideration of the influence of a failure of the device on the other devices, a failure rate, a result of a hazard and operability study (HAZOP), and the like.

The operator 25 includes, for example, an input device such as a keyboard or a pointing device and inputs an operation signal corresponding to an operation for the operator 25 into the processor 24. The display 26 includes, for example, a display device such as a liquid crystal display device and displays various kinds of information (for example, the plant state diagram described above) output from the processor 24. The operator 25 and the display 26 may be integrated as in the case of a liquid crystal display device of a touch panel type having both a display function and an operation function.

A program realizing the functions (the functions of the difference calculator 24a, the plant state diagram generator 24b, and the display condition setter 24c) of the processor 24 described above, for example, is distributed in the state being recorded on a computer-readable recording medium such as a CD-ROM or a DVD (registered trademark)-ROM or is distributed through an external network such as the Internet. The functions described above are realized by software by reading and installing the program recorded on the recording medium or installing the program downloaded through an external network.

<Plant Diagram and Plant State Diagram>

Figure 3:
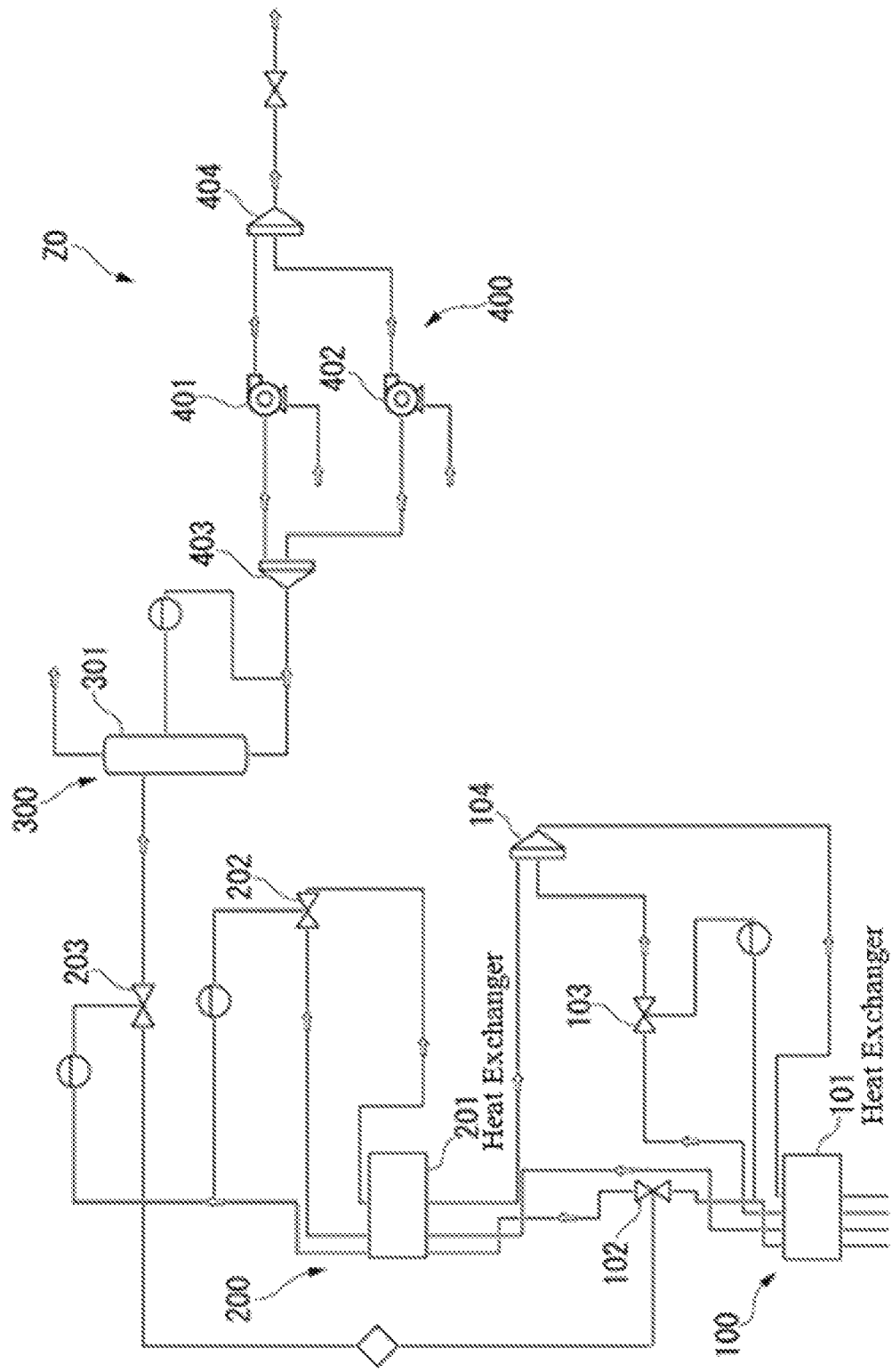
FIG. 3 is a diagram showing an example of a plant diagram.
Figure 4:
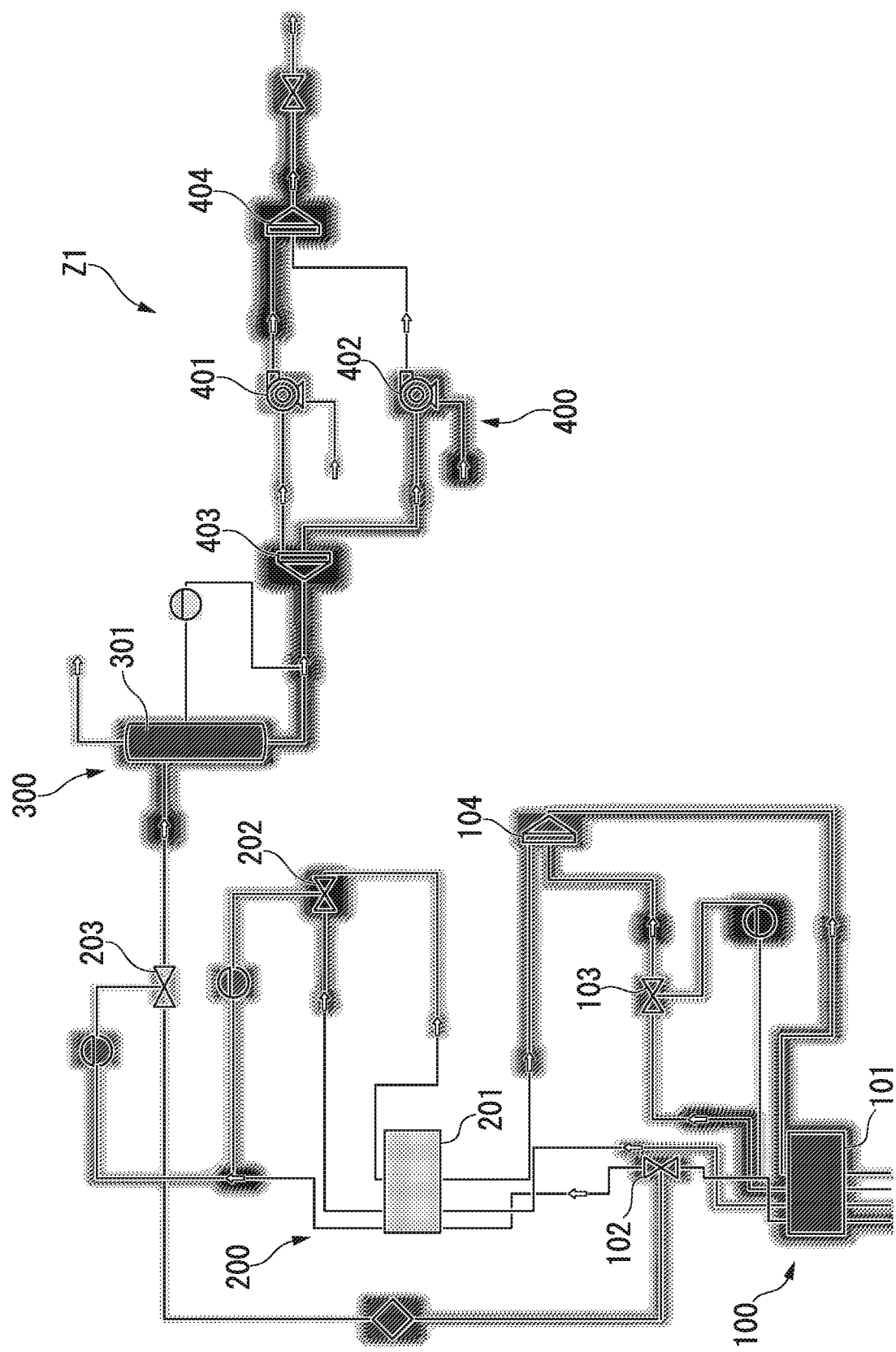
FIG. 4 is a diagram showing an example of a plant state diagram according to one or more embodiments of the present invention.
Figure 5:
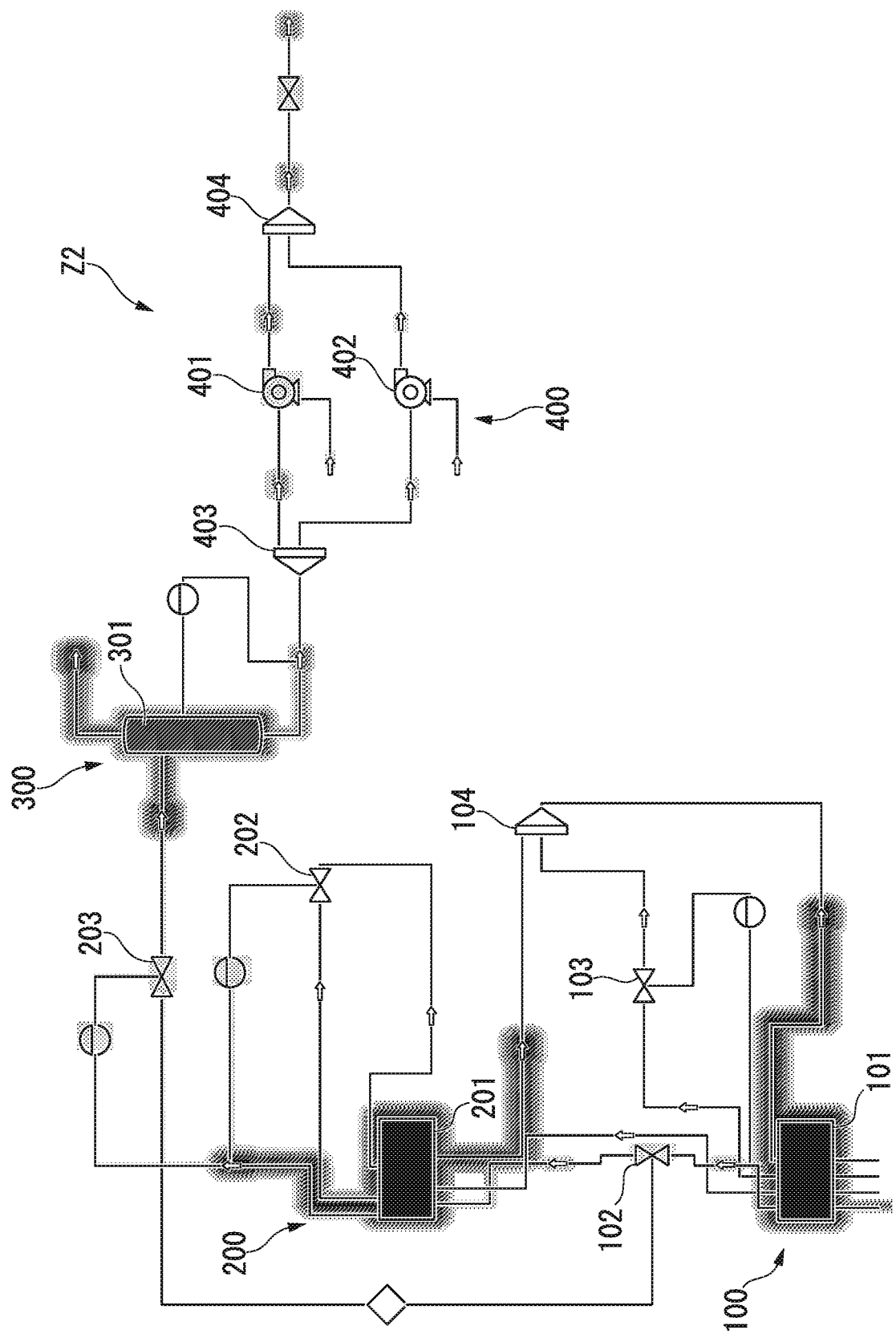
FIG. 5 is a diagram showing another example of a plant state diagram according to one or more embodiments of the present invention.

FIG. 3 is a diagram showing an example of the plant diagram. FIG. 4 is a diagram showing an example of the plant state diagram according to one or more embodiments of the present invention, and FIG. 5 is a diagram showing another example of the plant state diagram according to one or more embodiments of the present invention. A plant diagram Z0 shown in FIG. 3 as an example and plant state diagrams Z1 and Z2 shown in FIGS. 4 and 5 as examples are based on the P&ID and are diagrams respectively showing the configuration and the state of a part of facilities (particularly, facilities realizing a liquefaction process by forming liquefied natural gas (LNG) by liquefying natural gas) of a plant.

The facilities in the plant diagram Z0 shown in FIG. 3 includes a primary cooling apparatus 100, a secondary cooling apparatus 200, a storage apparatus 300, and a delivery apparatus 400. The primary cooling apparatus 100 includes a heat exchanger 101, valves 102 and 103, and the like and cools natural gas by performing heat exchange with the natural gas supplied from the upstream side. The secondary cooling apparatus 100 includes a heat exchanger 201, valves 202 and 203, and the like and cools natural gas by performing heat exchange with the natural gas supplied from the primary cooling apparatus 100. The storage apparatus 300 includes a tank 301 and the like and stores LNG supplied from the secondary cooling apparatus 200. The delivery apparatus 400 includes pumps 401 and 402 and the like and sends out the LNG stored in the tank 301 of the storage apparatus 300 to the downstream side.

A plant state diagram Z1 shown in FIG. 4 is a diagram in which the densities of devices and apparatuses included in the facilities shown in the plant diagram Z0 of FIG. 3 are changed according to the magnitudes of differences between the plant information acquired from the facilities shown in the plant diagram Z0 of FIG. 3 and the reference values RV (see FIG. 2). The plant state diagram Z1 shown in FIG. 4 can be also regarded as a diagram in which the density is different according to the magnitude of the difference, and hatching of a shape according to the shape of a device or an apparatus included in the facilities shown in the plant diagram Z0 is displayed to be superimposed on the plant diagram Z0.

In the plant state diagram Z1 shown in FIG. 4, the heat exchanger 201 disposed in the secondary cooling apparatus 200 has a lowest density. A merging portion 104 of pipes of the primary cooling apparatus 100, the pumps 401 and 402 disposed in the delivery apparatus 400, and the like have a next lowest density. In the plant state diagram Z1 shown in FIG. 4, the density becomes higher in order of the tank 301 disposed in the storage apparatus 300, the heat exchanger 101 disposed in the primary cooling apparatus 100, and a classifying portion 403 and a merging portion 404 of pipes of the delivery apparatus 400.

In the plant state diagram Z1 shown in FIG. 4, piping portions are shown with the densities changed. The reason for this is that sensor devices such as a flowmeter and the like are attached to the piping portions. In a case in which a simulator is used, the state of a portion in which a sensor device is not disposed can be estimated through a simulation, and accordingly, a piping portion to which a sensor device is not attached, as in the plant state diagram Z1 shown in FIG. 4, can be shown with the density changed.

In a case a heat map acquired by classifying and visualizing the plant state diagram Z1 shown in FIG. 4 by using colors is formed, the heat exchanger 201 disposed in the secondary cooling apparatus having the lowest density is, for example, displayed in blue. In addition, the merging portion 104 of pipes of the primary cooling apparatus 100, the pumps 401 and 402 disposed in the delivery apparatus 400, and the like having a next lowest density, for example, are displayed in green or yellow green. Furthermore, the tank 301 disposed in the storage apparatus 300 is, for example, displayed in yellow, the heat exchanger 101 disposed in the primary cooling apparatus 100 is, for example, displayed in orange, and the classifying portion 403 and the merging portion 404 of pipes of the delivery apparatus 400 are, for example, displayed in red.

As shown in FIG. 4 as an example, in the plant state diagram Z1, each device shown in the plant diagram Z0 shown in FIG. 3 is displayed with a density corresponding to the magnitude of the difference described above. Alternatively, in the plant state diagram Z1, each device shown in the plant diagram Z0 shown in FIG. 3 is displayed in a color corresponding to the magnitude of the difference described above. For this reason, by referring to the plant state diagram Z1, the state (whether or not being separate from the reference value RV) of each device disposed in the range shown in the plant state diagram Z1 can be accurately perceived in a short time.

The plant state diagram Z2 shown in FIG. 5 is similar to the plant state diagram Z1 shown in FIG. 4 but is acquired by performing filtering using the filtering condition (for example, the degree of importance of each device) described above. In the plant state diagram Z2 shown in FIG. 5, for example, a degree of importance that is higher than those of the other apparatuses or devices is set to the heat exchanger 101 disposed in the primary cooling apparatus 100, the heat exchanger 201 disposed in the secondary cooling apparatus 200, the tank 301 disposed in the storage apparatus 300, and the like. For this reason, in FIG. 5, while the heat exchanger 101 disposed in the primary cooling apparatus 100, the heat exchanger 201 disposed in the secondary cooling apparatus 200, the tank 301 disposed in the storage apparatus 300, and the like are displayed with an increased density, the classifying portion 403 and the merging portion 404 of the pipes of the delivery apparatus 400 and the like are not displayed with an increased density.

<Operation of Plant State Displaying Apparatus>

Figure 6:
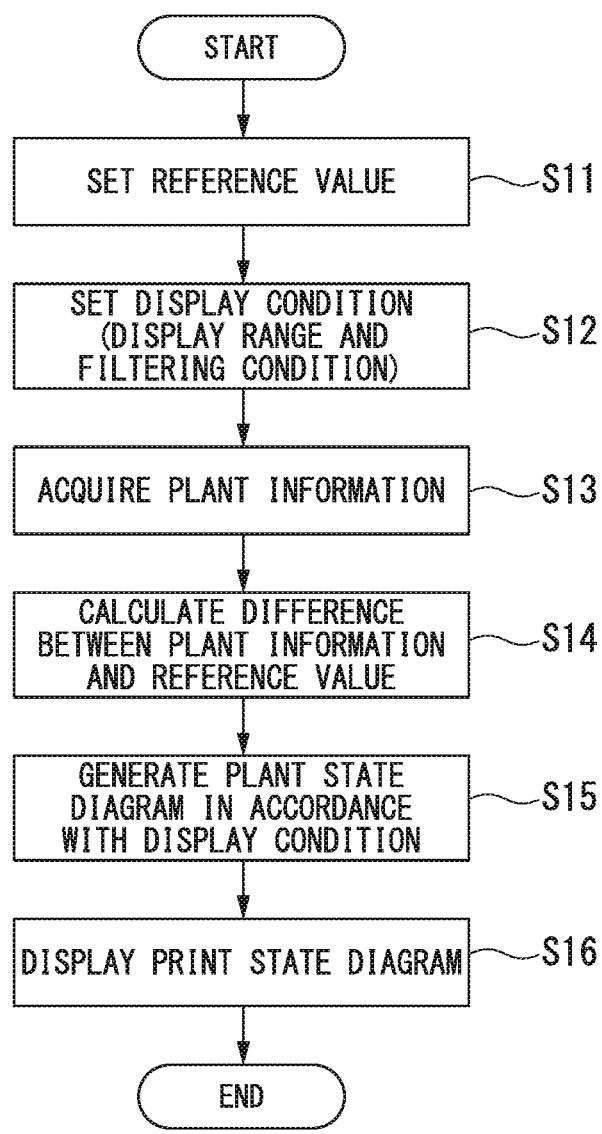
FIG. 6 is a flowchart showing an example of the operation of a plant state displaying apparatus 15 according to one or more embodiments of the present invention.

FIG. 6 is a flowchart showing an example of the operation of the plant state displaying apparatus 15 according to one or more embodiments of the present invention. First, in the plant state displaying apparatus 15, a process of setting a reference value RV is performed (Step S11). For example, when a user using the plant state displaying apparatus 15 performs an operation of inputting a reference value for the operator 25, a process of storing the reference value input according to the operation in the storage 23 as a reference value RV is performed by the processor 24. In this way, the reference value RV is set.

Next, the plant state displaying apparatus 15 performs a process of setting a display condition (Step S12). For example, when a user performs an operation of inputting the range of the plant state diagram to be displayed on the display 26, a process of setting the range input according to the operation as one of the display conditions is performed by the display condition setter 24c. In addition, when the user performs an operation of inputting the filtering condition (the type, the degree of importance, the degree of degradation, or the like of the device) described above for the operator 25, a process of setting the filtering condition input according to the operation as another display condition is performed by the display condition setter 24c.

When the setting described above is completed, the plant state displaying apparatus 15 performs a process of acquiring plant information (Step S13). For example, the lower layer interface 22 is controlled by the processor 24, and communication between the processor 24 and the controller 12 is performed through the control network N2, whereby latest plant information is acquired by the processor 24 from the controller 12. The latest plant information acquired from the controller 12 relates to devices disposed within the range set as one of display conditions in Step S12.

Subsequently, in the plant state displaying apparatus 15, a process of calculating a difference between the plant information acquired in Step S13 and the reference value set in Step S11 is performed by the difference calculator 24a (Step S14). When the difference is calculated, a process of generating a plant state diagram according to the display condition set in Step S12 is performed by the plant state diagram generator 24b (Step S15: generation step). The generated plant state diagram is output from the plant state diagram generator 24b to the display 26. Accordingly, for example, the plant state diagram Z1 shown in FIG. 4 or the plant state diagram Z2 shown in FIG. 5 is displayed on the display 26 (Step S16: display step).

The operation of the plant state displaying apparatus 15 described with reference to FIG. 6 is merely an example, and the order of the processes of Steps S11 to S16 shown in FIG. 6 may be changed. For example, the process (the process of Step S12) of setting a display condition described above may be performed between the process (the process of Step S14) of calculating a difference described above and the process (the process of Step S15) of generating a plant state diagram.

<Animation Display>

Figure 7A:
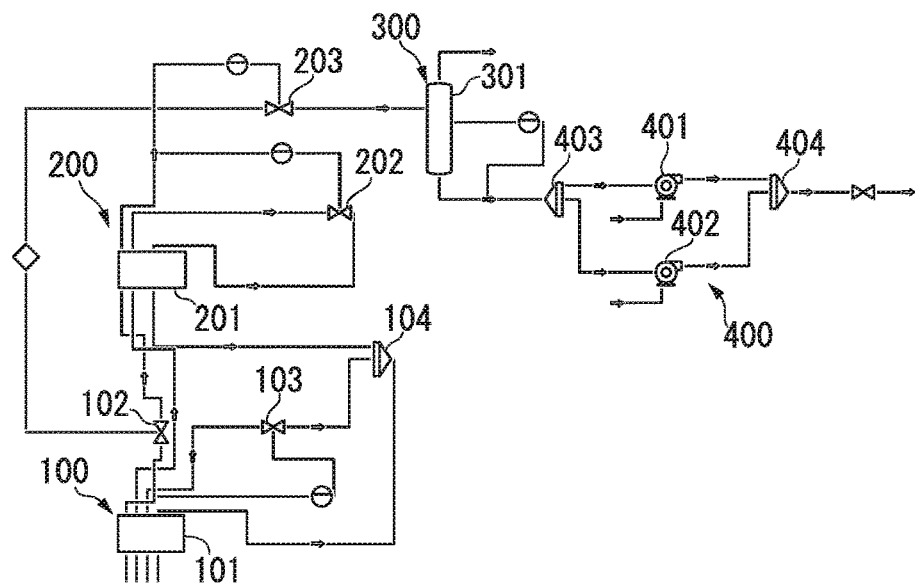
FIG. 7A is a diagram showing an example of animation display according to one or more embodiments of the present invention.
Figure 7B:
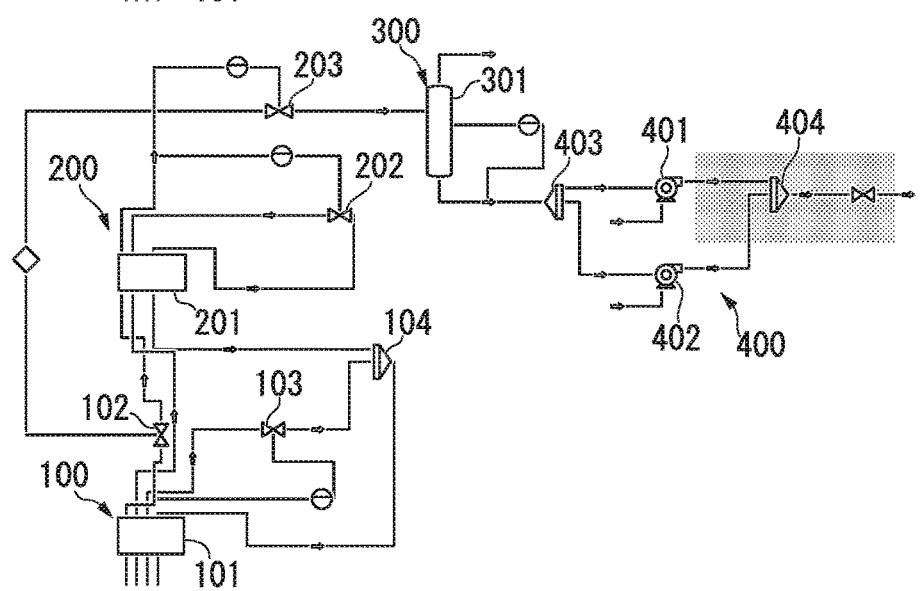
FIG. 7B is a diagram showing an example of animation display according to one or more embodiments of the present invention.
Figure 7C:
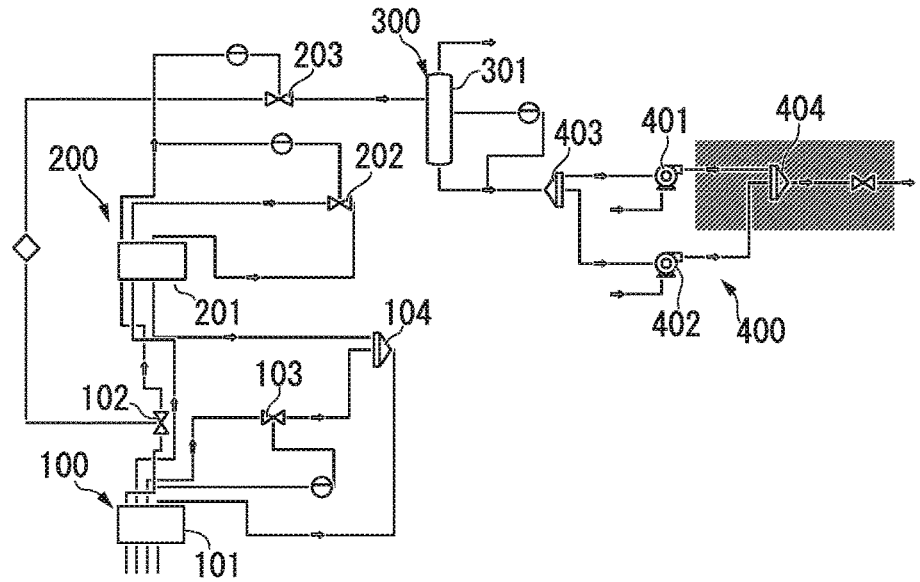
FIG. 7C is a diagram showing an example of animation display according to one or more embodiments of the present invention.

FIGS. 7A to 7C are diagrams showing an example of animation display according to one or more embodiments of the present invention. FIGS. 7A to 7C are diagrams respectively showing snapshots SN generated at mutually-different time. Particularly, the snapshot SN shown in FIG. 7A is generated using plant information acquired from each device installed in the plant at time t0. The snapshot SN shown in FIG. 7B is generated using plant information acquired from each device installed in the plant at time t1 that is after the time t0. The snapshot SN shown in FIG. 7C is generated using plant information acquired from each device installed in the plant at time t2 that is after the time t1. For example, the time t0 is time when the operation of the plant is started or time when restarting is started after maintenance of the plant or the like is performed.

The snapshots SN shown in FIGS. 7A to 7C are acquired by calculating differences between plant information acquired from each device installed in the plant at the time t0 to t2 and the reference value RV defined in advance. At the time t0, a difference between the plant information acquired from each device installed in the plant and the reference value RV is mostly not present, and accordingly, the snapshot SN shown in FIG. 7A is almost the same as the plant diagram Z0 shown in FIG. 3.

At the time t1, a difference between plant information acquired from each device installed in the plant and the reference value RV increases. For example, in a case where a difference between plant information and the reference value RV at the merging portion 404 of the pipes increases, as in the snapshot SN shown in FIG. 7B, the merging portion 404 of the pipes and the peripheral portion thereof are displayed with a density (or a color) corresponding to the magnitude of the difference. At time t2, in a case where a difference between plant information and the reference value RV at the merging portion 404 of the pipes further increases, as in the snapshot SN shown in FIG. 7C, the merging portion 404 of the pipes and the peripheral portion thereof are displayed with a further higher (denser or lighter) density (or a color associated with a larger difference).

The plant state diagram generator 24b of the plant state displaying apparatus 15 reads the snapshots SN shown in FIGS. 7A to 7C from the storage 23 and displays the read snapshots SN on the display 26 in order of time series, whereby animation display for changes in the state of the plant is performed. According to such animation display, a user can perceive that the density (or the color) of the merging portion 404 of the pipes changes in order of the time series (in order of time t0, time t1, and time t2). In this way, the user can perceive that the merging portion 404 of the pipes is a place at which the influence of variations in the load is high, and the degradation has progressed.

In this way, in one or more embodiments of the present invention, the plant state diagram generator 24b reads snapshots SN from the storage 23 and performs animation display thereof on the display 26 in order of the time series. In this way, animation display of changes in the state of the plant in the paste can be performed, and thus, for example, a user can easily find a device on which the influence of load variations is high and a device of which degradation has progressed.

In the state in which the animation display is displayed on the display 26, when a range in which a change occurs is selected according to click or the like through an input unit such as a mouse at the moment at which the changes occur in the display of the difference, time information when the click is performed and information of a clicked target range are stored in the storage, and the plant state diagram generator 24b may specify a time point or time when a trend waveform to be described later is clicked based on the stored information.

In the example described with reference to FIGS. 7A to 7C, for easy understanding, as a device on which a high influence of a load change is present, while the merging portion 404 of the pipes is shown, this is merely an example. For example, in FIGS. 7B and 7C, "at least one device among devices installed in a hatching range" may be determined as a device (or a device of which degradation has progressed) on which the influence of a load change is high. The reason for this is that, since there is a possibility that a valve disposed on the periphery of the merging portion 404 is blocked, and it is difficult for a fluid to flow therethrough, and whether the degradation of the merging portion 404 has progressed or degradation of a valve disposed on the periphery has progressed is determined based on whether or not flowmeters are present before and after the valve.

As described above, in one or more embodiments of the present invention, a difference between plant information acquired from a device installed in the plant and the reference value defined in advance is calculated, and a plant state diagram in which at least one of the color and the density of the device from which the plant information is acquired is changed according to the magnitude of the difference is displayed. For this reason, by referring to the displayed plant state diagram, the state of the plant can be accurately perceived in a short time.

In addition, in one or more embodiments of the present invention, the range of the plant state diagram to be displayed on the display 26 can be set as a display condition. For example, a display condition such as display of a plant state diagram showing the whole plant or display of a plant state diagram showing only a part of the plant can be set. For this reason, the state of an arbitrary range of the plant can be accurately perceived in a short time.

Furthermore, in one or more embodiments of the present invention, by setting a filtering condition (the type, the degree of importance, the degree of degradation, and the like of a device), devices each displayed with at least one of the color and the density changed in the plant state diagram can be freely screened (filtered). For this reason, by appropriately setting the filtering condition, for example, the state of a specific device can be accurately perceived in a short time, and accordingly, various analyses that are necessary from the viewpoint of a worker or an operator of the plant can be performed.

In this way, according to one or more embodiments of the present invention, since the state of an arbitrary range of a plant can be accurately perceived in a short time, for example, workers or operators of the plant can perceive a portion of the plant in which an abnormality occurs or a position in the plant causing the abnormality, and the like quickly and accurately. In addition, according to one or more embodiments of the present invention, since the state of a specific device can be accurately perceived in a short time, a device that is a maintenance target can be perceived. In this way, before the generation of an alarm, a countermeasure that is appropriate for maintaining the performance of the plant can be appropriately performed through a prediction.

<Process Control System>

Figure 8:
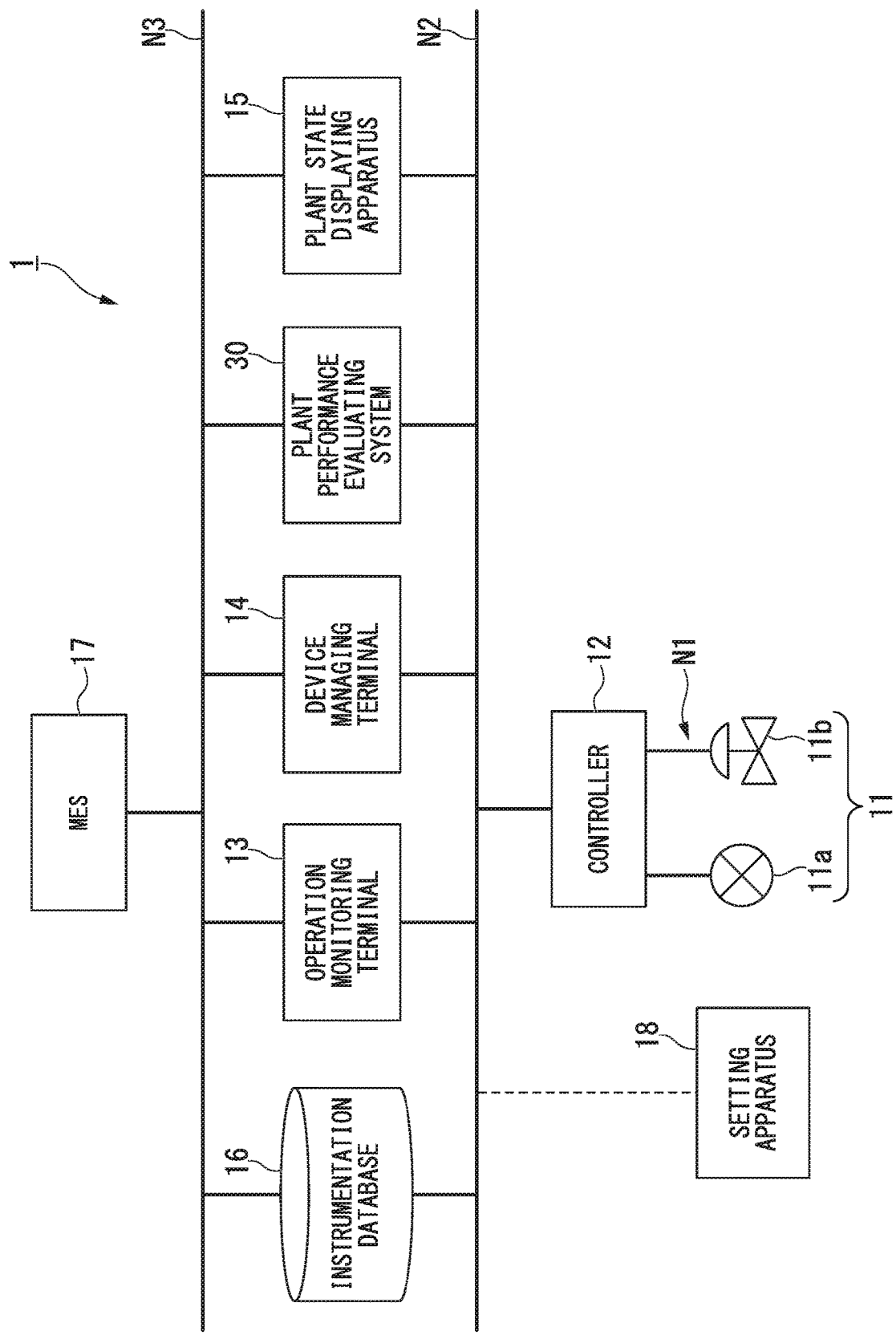
FIG. 8 is a block diagram showing the whole configuration of a process control system according to one or more embodiments of the present invention.

FIG. 8 is a block diagram showing the whole configuration of a process control system according to one or more embodiments of the present invention. The process control system 1 shown in FIG. 8 has a configuration acquired by adding a plant performance evaluating system 30 (simulator) to the process control system 1 shown in FIG. 1. This plant performance evaluating system 30 includes a static simulator and a dynamic simulator (or a static simulator and a tracking simulator) and simulates a plant.

The static simulator described above simulates a steady state or devices included in a plant by using a static model (a model modeling the steady state of the devices included in the plant). The dynamic simulator described above performs a simulation for a plant in consideration of mutual relations of devices included in the plant by using a dynamic model (a model modeling a dynamic state (a non-steady state) in consideration of the mutual relations of the devices included in the plant).

The tracking simulator reliably simulates the state of a plant following the actual plant online in real time. Details of a plant performance evaluating system including the static simulator and the dynamic simulator (or the static simulator and the tracking simulator) are disclosed in Japanese Patent Application Publication No. 2016-021116.

<Plant State Displaying Apparatus>

Figure 9:
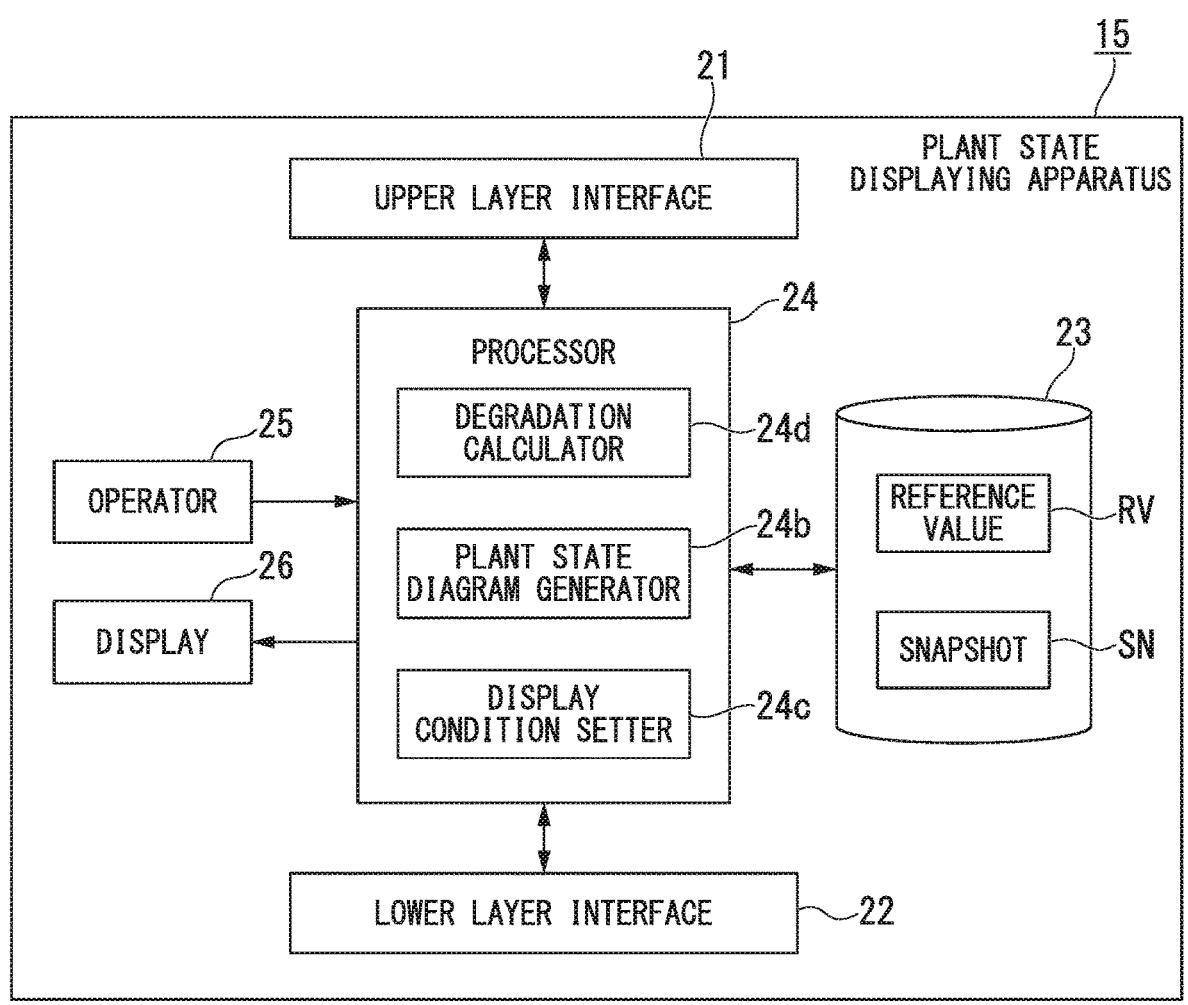
FIG. 9 is a block diagram showing the main configuration of a plant state displaying apparatus according to one or more embodiments of the present invention.

FIG. 9 is a block diagram showing the main configuration of a plant state displaying apparatus according to one or more embodiments of the present invention. As shown in FIG. 9, the plant state displaying apparatus 15 according to one or more embodiments of the present invention has a configuration acquired by replacing the difference calculator 24a of the plant state displaying apparatus 15 shown in FIG. 1 with a degradation calculator 24d and displays a degree of degradation of a plant as the state of the plant.

The degradation calculator 24d calculates a degree of degradation (state value) of each device installed in the plant by using plant information acquired from the device installed in the plant. The degradation calculator 24d calculates a degree of degradation of a device, for example, by using a method described below.

(A) Calculation on the basis of a result of measurement performed by a device state measurement sensor
(B) Calculation from a change (a change in the ratio of an operation amount to a set value or the like) in the operation amount of a controller
(C) Calculation of elapsed time from previous maintenance time
(D) Calculation by generating a model of a device from a process value acquired from the device The method of (A) described above is a method of calculating a degree of degradation based on a result of a measurement performed by a device state measurement sensor (for example, a vibrometer attached to a rotator) installed in a plant for measuring the state of each device installed in the plant. In this method, for example, in a case where the device state measurement sensor is a vibrometer attached to a rotator, a process of calculating a degree of degradation of the rotator based on the magnitude of vibration measured by the vibrometer is performed by the degradation calculator 24d.

The method of (B) described above is a method of calculating a degree of degradation from a change in an operation amount for a controller 12 to operate a certain device. In this method, for example, in a case where the operation target of the controller 12 is a valve device 11b (see FIG. 1), a process of calculating a degree of degradation of the valve device 11b from a change in the ratio of a theoretical set value for setting a certain degree of opening of the valve device 11b to an operation amount that is actually directed to the valve device 11b by the controller 12 is performed by the degradation calculator 24d.

The method of (C) described above is a method of calculating a degree of degradation based on the length of an elapsed time from the previous maintenance time. Generally, a device installed to a plant tends to have an increased frequency at which maintenance is necessary as the operation time increases. In this method, a process of calculating a degree of degradation of a device from the length of an elapsed time from the previous maintenance time of the device is performed by the degradation calculator 24d. Information representing the previous maintenance time can be acquired from a device in a case where the information is stored in the device installed in the plant and can be input, for example, by operating the operator 25 in a case where the information is not stored in the device installed in the plant.

The method (D) described above is a method of calculating a degree of degradation by using a simulator (for example, the plant performance evaluating system 30 shown in FIG. 8) simulating a plant. For example, the dynamic simulator disposed in the plant performance evaluating system 30 shown in FIG. 8 can simulate a degree of degradation of a device included in the plant. In this method, for example, a process of requesting the plant performance evaluating system 30 to simulate a degree of degradation of a device installed in the plant and acquiring a result of the simulation is performed by the degradation calculator 24d.

<Plant State Diagram>

Figure 10:
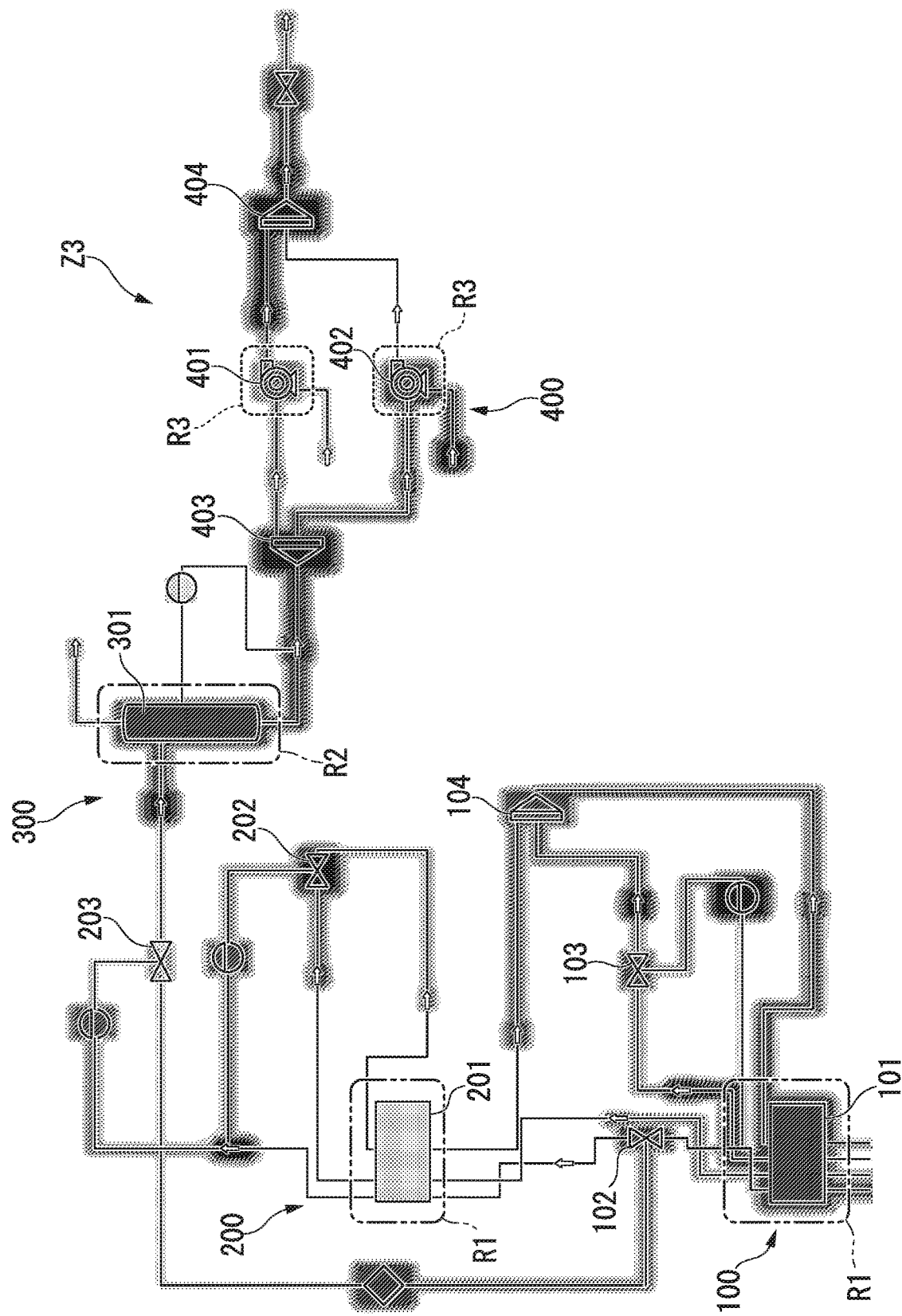
FIG. 10 is a diagram showing an example of a plant state diagram according to one or more embodiments of the present invention.
Figure 11:
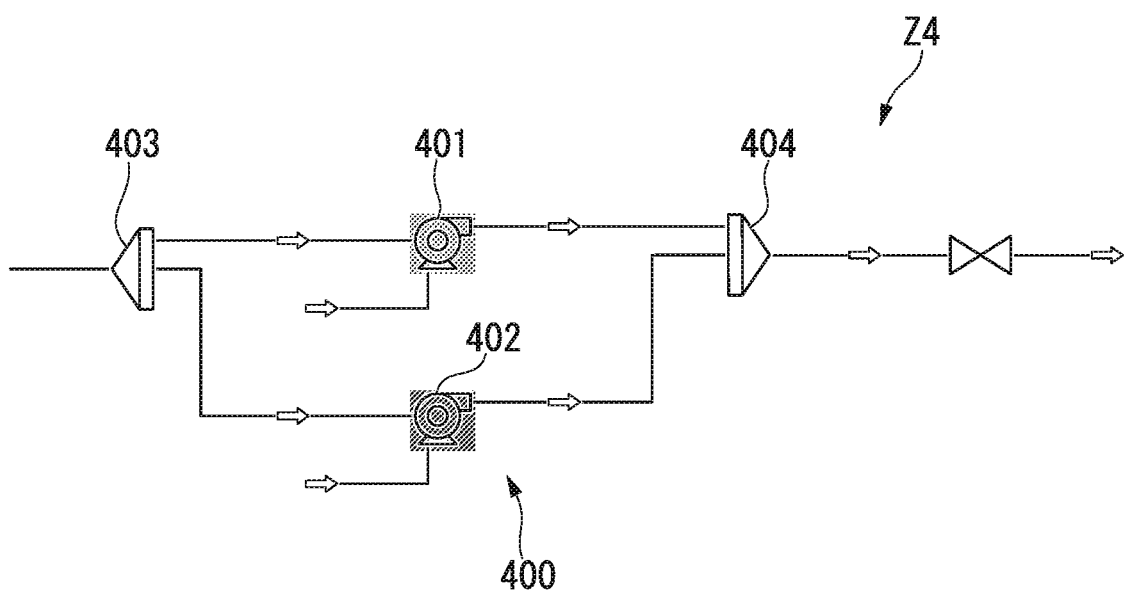
FIG. 11 is a diagram showing another example of a plant state diagram according to one or more embodiments of the present invention.

FIG. 10 is a diagram showing an example of a plant state diagram according to one or more embodiments of the present invention, and FIG. 11 is a diagram showing another example of the plant state diagram according to one or more embodiments of the present invention. For easy understanding, in FIG. 10, similar to the plant state diagram Z1 shown in FIG. 4, a plant state diagram Z3 generated on the basis of the plant diagram Z0 shown in FIG. 3 is shown. In other words, the plant state diagram Z3 shown in FIG. 10 is a diagram in which a device or an apparatus included in facilities shown in the plant diagram Z0 of FIG. 3 is changed according to a degree of degradation calculated using plant information acquired from the facilities shown in the plant diagram Z10 of FIG. 3.

By referring to the plant state diagram Z3 shown in FIG. 10, similar to the plant state diagram Z1 shown in FIG. 4, it can be understood that a device or an apparatus included in the facilities shown in the plant diagram Z0 of FIG. 3 is shown with a density changed. The plant state diagram Z3 shown in FIG. 10, similar to the plant state diagram Z1 shown in FIG. 4, can be formed as a heat map by classifying and visualizing the plant state diagram Z3 by using colors. For this reason, by referring to the plant state diagram Z3, the states (the degrees of degradation) of devices installed in the range shown in the plant state diagram Z3 can be accurately perceived in a short time.

In addition, in one or more embodiments of the present invention, a plant state diagram according to a filtering condition set by the display condition setter 24c can be displayed. For example, in a case where a filtering condition of "a degree of degradation of 5% or less" is set, devices and apparatuses installed inside an area R1 in FIG. 10 are shown with the densities changed, in a case where a filtering condition of "a degree of degradation of 5 to 10%" is set, devices and apparatuses installed inside an area R2 in FIG. 10 are shown with the densities changed, and, in a case where a filtering condition of "a degree of degradation of 10% or more" is set, devices or apparatuses installed inside an area R3 in FIG. 10 are shown with the densities changed.

A plant state diagram Z4 shown in FIG. 11 is filtered using the type (particularly, a pump) of device. By referring to FIG. 11, in the plant state diagram Z4, only pumps 401 and 402 disposed in a sensing-out apparatus 400 are shown with the densities changed. In the plant state diagram Z4 shown in FIG. 11, only the delivery apparatus 400 including pumps (pumps 401 and 402) set in the filtering condition is displayed in an enlarged scale.

It is arbitrary to display only an apparatus including devices set in the filtering condition in an enlarged scale or display also other apparatuses (a primary cooling apparatus 100, a secondary cooling apparatus 200, and a storage apparatus 300) not including a device set in the filtering condition without enlarged display. While an example in which "the type of device" is set as the filtering condition has been described, another filtering condition such as "the degree of importance of a device" may be set.

<Operation of Plant State Displaying Apparatus>

The plant state displaying apparatus 15 according to one or more embodiments of the present invention basically performs an operation similar to that of the plant state displaying apparatus 15 discussed above except that a degree of degradation is calculated by the degradation calculator 24d. In other words, the plant state displaying apparatus 15 according to one or more embodiments of the present invention basically operates according to the flowchart shown in FIG. 6. For this reason, a detailed operation of the plant state displaying apparatus 15 according to one or more embodiments of the present invention will not be described.

As described above, in one or more embodiments of the present invention, a degree of degradation of each device installed in a plant is calculated by using plant information acquired from the device installed in the plant, and a plant state diagram in which at least one of the color and the density of the device from which the plant information is acquired is changed according to the degree of degradation and is displayed. For this reason, by referring to the displayed plant state diagram, the state of the plant can be accurately perceived in a short time.

In addition, in one or more embodiments of the present invention, the range of the plant state diagram to be displayed on the display 26 and a filtering condition (the type, the degree of importance, and the degree of degradation of a device) can be set as a display condition. For this reason, the state of an arbitrary range of the plant (or the state of a specific device) can be accurately perceived in a short time. In addition, various analyses that are necessary from the viewpoint of a worker or an operator of the plant can be performed, and, before the generation of an alarm, an appropriate countermeasure for maintaining the performance of the plant can be appropriately performed through a prediction.

In addition, in a case where the degradation calculator 24d of the plant state displaying apparatus 15 calculates a degree of degradation by using the plant performance evaluating system 30 (including a tracking simulator), the snapshot SN can be regularly generated. By superimposing past (for example, two months ago or one month ago) and current snapshots, an abnormal device (for example, a device in which an abnormality slowly progresses) can be easily specified. By shortening an interval at which the snapshot SN is generated, the whole system of the plant can be constantly monitored.

As above, while the plant state displaying apparatus, the plant state displaying system, and the method of displaying a plant state according to one or more embodiments of the present invention have been described in detail, the present invention can be freely changed within the scope of the present invention without being limited to the embodiments described above. For example, by combining the embodiments described above, the plant state displaying apparatus 15 may be configured to include both the difference calculator 24a and the degradation calculator 24d. In such a case, both a plant state diagram in which the color or the density is changed according to the magnitude of a difference between the plant information and the reference value and a plant state diagram in which the color or the density is changed according to the degree of degradation can be displayed. In addition, such plant state diagrams may be displayed to be superimposed. In this way, for example, whether or not the cause of an abnormality in the process value relates to facility degradation can be easily reviewed.

In the embodiments described above, the plant state displaying apparatus 15 and the MES 17 are not linked with each other. However, by linking the plant sate displaying device 15 and the MES 17 with each other, the dependency of the progress of degradation on a product type, a material, a production amount, and the like may be configured to be conceivable. In such a case, improvement of the precision of a reinforcement plan at the time of repairing a plant or the like and the precision at the time of designing a similar plant can be expected.

In addition, in a case where a heat map is generated, colors according to the magnitude of the difference and the degree of degradation may be separately used according to the degree of importance of each device. For example, there is a situation in which colors of a red color system are used for devices having a high degree of importance, and colors of a green color system are used for devices having a low degree of importance. In a case where the magnitude of the difference or the degree of degradation is large, the color may be thickened, and, in a case where the magnitude of the difference or the degree of degradation is small, the color may not be thickened. In such a case, a state change or a degree of degradation from a reference state of a device installed in the plant including the degree of importance of the device can be accurately perceived in a short time.

In addition, in a case where the plant sate diagram is displayed, for example, a range selected according to an operation such as click or drag designation may be displayed in an enlarged scale (drill down). In such a case, for example, like from a whole diagram to PFD, and from PFD to P&ID (or a facility arrangement diagram), drilling-down may be performed while the format of the plant diagram is changed. In addition, in considering that the format of a plant diagram that can be easily used by a user depends on the user, the format of a plant diagram may be configured to be arbitrarily designated.

In addition, in a case where the plant state diagram is displayed, additional information relating to the display content of the plant state diagram may be displayed as well. For example, there is a situation in which symbols (arrows) or marks representing the change trends described in Patent Document 2 are added to the display content of the plant state diagram.

In addition, in a case where the plant state diagram is displayed in the setting apparatus 18 (see FIGS. 1 and 8) used at the site of the plant, for example, a plant state diagram in which an image captured using a camera disposed in the setting apparatus 18 is used as a plant diagram may be displayed. In other words, in a case where a plant state diagram is displayed in the setting apparatus 18, the plant state diagram may be displayed using an augmented reality (AR) technology.

Furthermore, in one or more embodiments of the present invention, a plant state diagram in which the color or the density is changed according to a degree of degradation multiplied by a coefficient according to the degree of importance of the device may be generated and displayed. The reason for configuring as such is that there are cases where, for example, devices having the same degree of degradation have different degrees of influence on the operation of the plant in accordance with the degrees of importance of the devices. In such a case, although devices have the same degree of degradation, a device having a relatively high degree of importance is displayed with a density higher than that of a device having a relatively low degree of importance.

In addition, while the plant state diagram in the embodiments described above represents a state of a plant at a certain time point, the plant state diagram may be configured to represent the state of a plant for a certain period. Such a plant state diagram can be regarded as a plant state diagram in which at least one of the color and the density is changed according to the magnitude of a state value (for example, a statistical value (for example, a mean value, a median value, a maximum value, a minimum value, or the like: a numerical value calculated using the state value) of the plant information and the reference value RV (a difference or a degree of degradation)) representing the state of the plant. By displaying such a plant state diagram, for example, a device having a high influence according to a load change or a device of which degradation has progressed within a certain period (constantly) can be easily found.

For example, in a case where a plant state diagram at a certain time point t11 and a plant state diagram at a different time point t12 are compared with each other, the plant state diagrams generated using plant information acquired at the timing of the time point t11 and plant information acquired at the timing of the time point t12 are compared. For this reason, even in a case where the timings slightly deviate from each other, an appropriate comparison cannot be performed, and there is a possibility that a change point is overlooked. In addition, in a state in which the operation state of a plant changes, cases may be considered in which the plant state diagrams generated respectively using the plant information acquired at the timing of the time point t11 and the plant information acquired at the timing of the time point t12 are not appropriate for perceiving the state of the plant.

In contrast to this, by displaying a plant state diagram in which at least one of the color and the density is changed according to the magnitude of the statistical value of a state value representing the state of a plant, the state of the plant in a certain period can be appropriately perceived. For example, by using the statistical value of the state value representing the state of the plant, a noise in the change in the operation condition of the plant can be eliminated, and accordingly, the state of the plant can be perceived more appropriately.

Figure 12A:
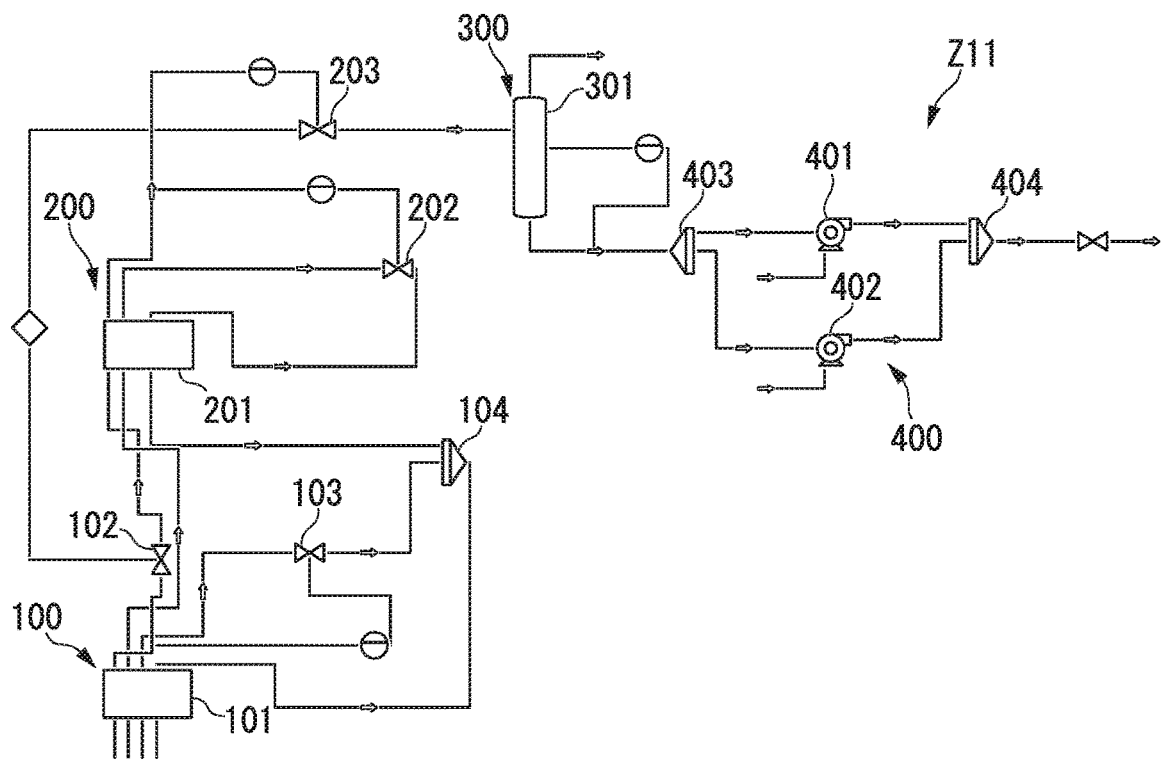
FIG. 12A is a diagram showing an example of a plant state diagram representing a plant state of a certain period.
Figure 12B:
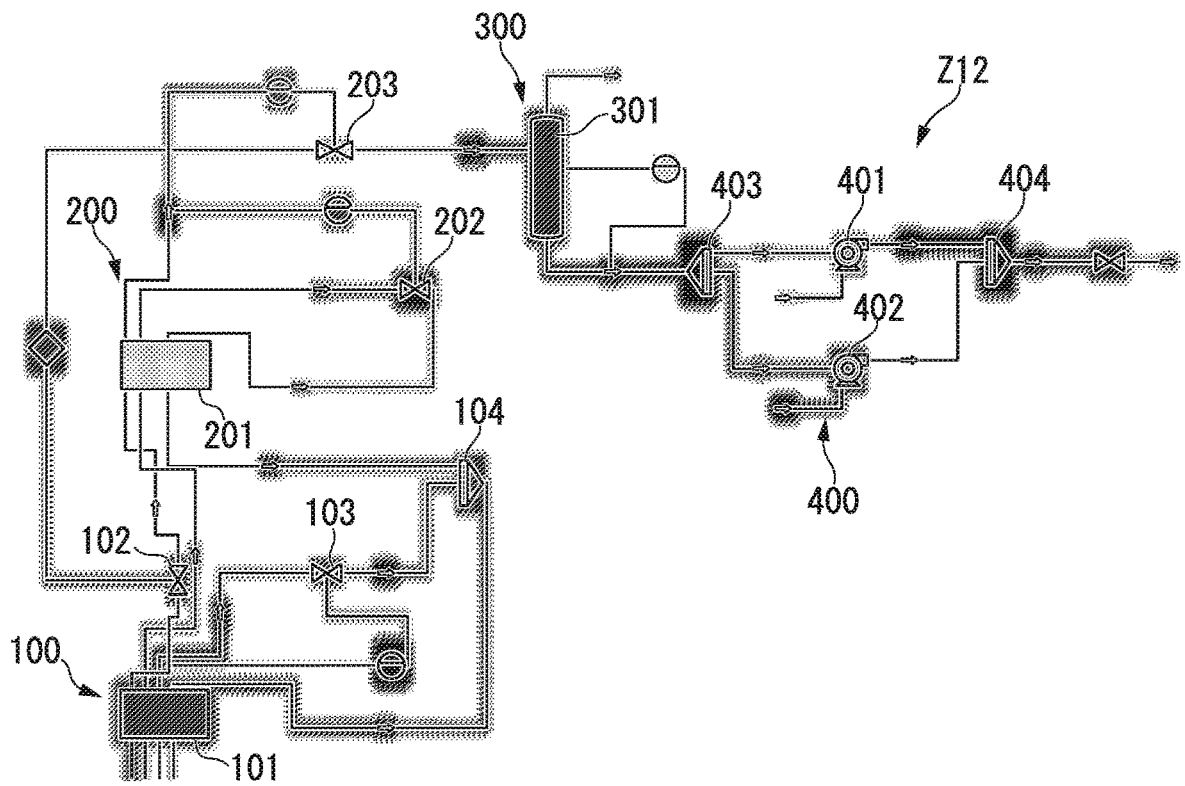
FIG. 12B is a diagram showing an example of a plant state diagram representing a plant state of a certain period.
Figure 13A:
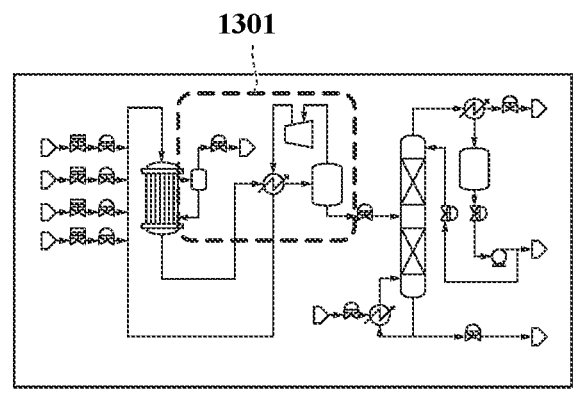
FIG. 13A is a diagram showing another display example of a plant state diagram.
Figure 13B:
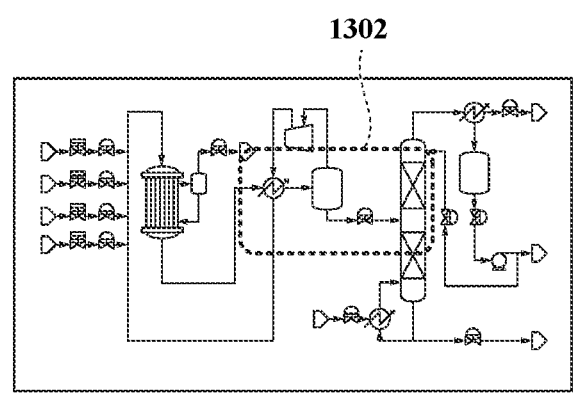
FIG. 13B is a diagram showing another display example of a plant state diagram.
Figure 13C:
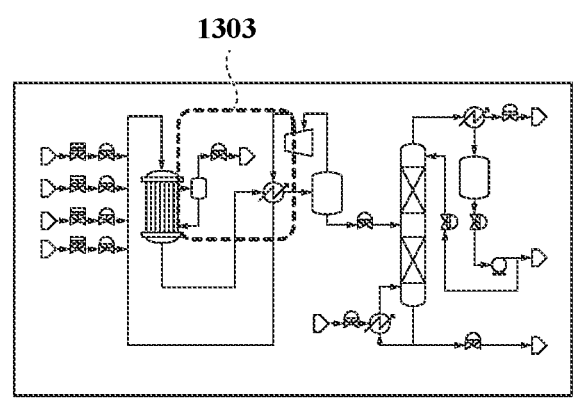
FIG. 13C is a diagram showing another display example of a plant state diagram.
Figure 13D:
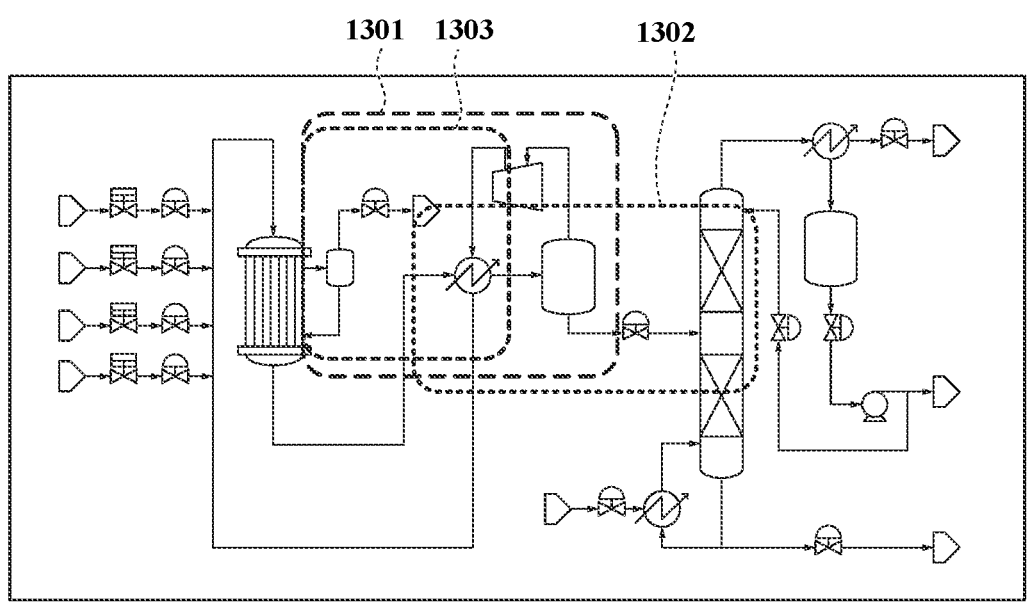
FIG. 13D is a diagram showing another display example of a plant state diagram.

FIGS. 12A and 12B are diagrams showing examples of a plant state diagram representing a plant state of a certain period. Particularly, a plant state diagram Z11 shown in FIG. 12A is generated based on a mean value of a difference between the plant information and the reference value RV in a certain period T1. In addition, a plant state diagram Z12 shown in FIG. 12B is generated based on a mean value of a difference between the plant information and the reference value RV in a period T2 different from the period T1 described above.

In this way, by displaying the plant state diagram representing the state of the plant in a certain period, for example, in a specific period (constantly), a device having a high influence according to a load change or a device of which degradation has progressed can be easily found. In addition, in a case where such a plant state diagram is generated, for example, a noise in the change in the operation condition of the plant is eliminated, and accordingly, the state of the plant can be more appropriately perceived.

In a case where a maximum value or a minimum value of the difference between the plant information and the reference value RV is used as the statistical value of the state value representing the state of the plant, the state of the plant and the state of each device can be analyzed with focusing on a noise or an abnormality in a plant operation condition in a certain period. In addition, in a case where a median value or a mean value of the difference between the plant information and the reference value RV is used as the statistical value of the state value representing the state of the plant, a noise or an abnormality in the plant operation condition in a certain period can be focused.

Particularly, there are cases where a range of no abnormality is determined based on the mean value at a glance. In other words, in a case where a difference between a mean value and a median value is large (for example, in a case where there is a deviation in a direction decreasing the numerical value as a whole), there is a possibility that the mean value is coincidently in the range of no abnormality under the influence of a large instantaneous value, and, in such a case, re-checking is necessary by narrowing down the time span. In other words, as described above, by comparing mean value display and median value display (or maximum value display and the minimum value display as well) with each other, an abnormality point at which there is a possibility of being buried (hidden) in the median value display can be checked.

Within a certain period, a derivative of the plant information acquired from each device installed in the plant may be calculated, and a plant state diagram in which the color or the density changes according to the magnitude of the calculated derivative may be generated. By using such a plant state diagram, the speed of degradation of each device can be acquired.

In addition, as a technique specifying a period in which an abnormality occurs and a period of a normal state, an operator may specify such periods by using a trend graph. A trend graph TG representing a change in the plant information in time is displayed on the display 26, for example, a slide bar SL1 is set in a portion prior to a portion in which an abnormality is recognized, and a slide bar SL2 is set in the portion in which the abnormality is recognized. Then, in the plant state displaying apparatus 15, a mean value of a difference between plant information and the reference value RV in each of a period T1 and a period T2 in which the slide bars SL1 and SL2 are set is acquired, each plant state diagram in which the color or the density is changed according to the mean value of the difference is generated is displayed on the display 26. In this way, the plant state diagram representing an average state of the plant in the period T1 and the plant state diagram representing an average state of the plant in the period T2 are displayed. By comparing such plant state diagrams, the cause of the abnormality can be easily reviewed.

A display in which the trend graph TG and the slide bars SL1 and SL2 are displayed does not necessarily need to be the same as the display performing difference display (display of the plant state diagram), and, for example, the trend graph and the slide bars may be displayed on the monitoring terminal, and the difference display (plant state diagram) may be displayed on a large-size display disposed in a central monitoring room.

In other words, in the plant state displaying apparatus according to one or more embodiments of the present invention, the display or a second display can display the trend graph (TG) representing a change in the plant information in time, and the generator may set a period set using the trend graph in accordance with instructions from the outside or set the period as a predetermined period.

In addition, in a case where the scale of the plant is large, and operation ranges are assigned to a plurality of workers, as shown in FIG. 13, the operation ranges of the workers may be displayed to be superimposed on the plant state diagram. FIGS. 13A to 13D are diagrams showing other display examples of the plant state diagram. In FIGS. 13A to 13C, areas 1301, 1302, and 1303 represent operation ranges to which the workers are respectively assigned. In a case where the plant state diagram, for example, as shown in FIG. 13D, all the operation ranges (the areas 1301, 1302, and 1303) of the workers are displayed to be superimposed on the plant state diagram. By performing such display, leaked communication, an operation omission, and the like can be prevented, and the assignment of staffs can be appropriately performed.

In addition, in the embodiments described above, an example has been described in which the plant state diagram generated by the plant state diagram generator 24b disposed in the plant state displaying apparatus 15 is displayed on the display 26 disposed in the plant state displaying apparatus 15. However, the plant state diagram generated by the plant state displaying apparatus 15 may be displayed in another apparatus (the operation monitoring terminal 13, the device managing terminal 14, the MES 17, or the setting apparatus 18). In a case where such display is performed, the plant state displaying apparatus 15 becomes a server apparatus generating the plant state diagram, and the another apparatus (the operation monitoring terminal 13, the device managing terminal 14, the MES 17, or the setting apparatus 18) becomes a display device displaying the plant state diagram.

Alternatively, the plant state diagram generated by the plant state displaying apparatus 15 may be displayed on a large-size display disposed in a center monitoring room or the like. In a case where such display is performed, the plant state displaying apparatus 15 becomes a server apparatus generating the plant state diagram, and the large-size display becomes a display device displaying the plant state diagram. By performing such display, information sharing among a plurality of operators is improved.

In addition, while the plant state diagrams described in the embodiments described above two-dimensionally represent changes in the color or the density in accordance with the magnitude of the state value (the difference, the degree of degradation, or the like) representing the state of the plant, for example, like a 3D bar graph, the state value may be three-dimensionally represented. In addition, the plant state diagram represented three-dimensionally can be referred to from various angles. By configuring as such, for example, not only the absolute value of the magnitude of the difference but also the sign (whether the difference has a positive value or a negative value) of the difference can be checked.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A plant state displaying apparatus displaying information representing a state of a plant, the plant state displaying apparatus comprising:
   a generator that:
      acquires plant information from at least one of devices, apparatuses, and facilities installed in the plant;
      calculates a state value representing a change in the state of the plant using the plant information; and
      generates a plant state diagram in which at least one of a color and a density of the at least one of devices, apparatuses, and facilities from which the plant information is acquired is changed according to magnitude of the state value; and
   a display that displays the plant state diagram generated by the generator as the information representing the state of the plant, wherein
   the generator further generates the plant state diagram in which information representing an operation range of a worker operating in the plant is superimposed on a diagram representing the plant.

2. The plant state displaying apparatus according to claim 1, further comprising:
   a setter that sets a display condition for displaying the plant state diagram on the display,
   wherein the generator generates the plant state diagram according to the display condition set by the setter.

3. The plant state displaying apparatus according to claim 2, wherein
   the setter sets a range of the plant state diagram to be displayed on the display as the display condition.

4. The plant state displaying apparatus according to claim 2, wherein
   the setter sets at least one of a first condition, a second condition, and a third condition in the plant state diagram,
   the first condition defines a type of the at least one of devices, apparatuses, and facilities represented with the at least one of a color and a density changed,
   the second condition defines a degree of importance of the at least one of devices, apparatuses, and facilities represented with the at least one of a color and a density changed, and
   the third condition defines a degree of degradation of the at least one of devices, apparatuses, and facilities represented with the at least one of a color and a density changed.

5. The plant state displaying apparatus according to claim 1, further comprising:
   a difference calculator that calculates the state value, wherein
   the state value is a difference between the plant information acquired through a network and a reference value.

6. The plant state displaying apparatus according to claim 1, further comprising:
   a degradation calculator that calculates a degree of degradation of the at least one of devices, apparatuses, and facilities installed in the plant as the state value using the plant information acquired through a network.

7. The plant state displaying apparatus according to claim 6, further comprising:
   a simulator that simulates the plant,
   wherein the degradation calculator calculates a degree of degradation of the at least one of devices, apparatuses, and facilities installed in the plant using a result of the simulation performed by the simulator.

8. The plant state displaying apparatus according to claim 1, further comprising:
   a storage;
   wherein the generator stores the generated plant state diagram in the storage together with time information representing generation time, reads the plant state diagram stored in the storage based on instructions from an outside, and displays the read plant state diagram on the display based on the time information.

9. The plant state displaying apparatus according to claim 8, wherein
the generator performs animation display of the plant state diagrams read from the storage on the display in order of a time series.

10. The plant state displaying apparatus according to claim 8, wherein
the generator displays a plant state diagram represented with at least one of the color and the density of the at least one of devices, apparatuses, and facilities from which the plant information is acquired being changed according to magnitude of a numerical value calculated using the state value within a predetermined period.

11. A plant state displaying system displaying information representing a state of a plant, the plant state displaying system comprising:
a server apparatus that:
acquires plant information from at least one of devices, apparatuses, and facilities installed in the plant;
calculates a state value representing a change in the state of the plant using the plant information; and
generates a plant state diagram in which at least one of a color and a density of the at least one of devices, apparatuses, and facilities from which the plant information is acquired is changed according to magnitude of the state value; and
a display device that is connected to the server apparatus through a network and that displays the plant state diagram generated by the server apparatus as the information representing the state of the plant, wherein
the server apparatus further generates the plant state diagram in which information representing an operation range of a worker operating in the plant is superimposed on a diagram representing the plant.

12. A plant state displaying method displaying information representing a state of a plant, the plant state displaying method comprising:
acquiring plant information from at least one of devices, apparatuses, and facilities installed in the plant;
calculating a state value representing a change in the state of the plant using the plant information;
generating a plant state diagram in which at least one of a color and a density of the at least one of devices, apparatuses, and facilities from which the plant information is acquired is changed according to magnitude of the state value; and
displaying the generated plant state diagram as the information representing the state of the plant, wherein
in the generated plant state diagram, information representing an operation range of a worker operating in the plant is superimposed on a diagram representing the plant.

13. The plant state displaying method according to claim 12, further comprising:
setting a display condition for displaying the plant state diagram,
wherein generating the plant state diagram includes generating the plant state diagram according to the display condition set.

14. The plant state displaying method according to claim 13, wherein
setting the display condition includes setting a range of the plant state diagram to be displayed as the display condition.

15. The plant state displaying method according to claim 13, wherein
setting the display condition includes setting at least one of a first condition, a second condition, and a third condition in the plant state diagram, the first condition defines a type of the at least one of devices, apparatuses, and facilities represented with the at least one of a color and a density changed, the second condition defines a degree of importance of the at least one of devices, apparatuses, and facilities represented with the at least one of a color and a density changed, and the third condition defines a degree of degradation of the at least one of devices, apparatuses, and facilities represented with the at least one of a color and a density changed.

16. The plant state displaying method according to claim 12, wherein
the state value is calculated as a difference between the plant information acquired through a network and a reference value.

17. The plant state displaying method according to claim 12, wherein
calculating the state value includes calculating a degree of degradation of the at least one of devices, apparatuses, and facilities installed in the plant as the state value using the plant information acquired through a network.

18. The plant state displaying method according to claim 17, further comprising:
simulating the plant,
wherein calculating the degree of degradation includes a degree of degradation of the at least one of devices, apparatuses, and facilities installed in the plant using a result of the simulation.

19. The plant state displaying method according to claim 12, further comprising:
storing the generated plant state diagram in a storage together with time information representing generation time,
wherein displaying the generated plant state diagram includes reading the plant state diagram stored in the storage based on instructions from an outside and displaying the read plant state diagram based on the time information.

20. A plant state displaying apparatus displaying information representing a state of a plant, the plant state displaying apparatus comprising:
a generator that:
acquires plant information from at least one of devices, apparatuses, and facilities installed in the plant;
calculates a state value representing a change in the state of the plant using the plant information; and
generates a plant state diagram in which at least one of a color and a density of the at least one of devices, apparatuses, and facilities from which the plant information is acquired is changed according to magnitude of the state value;
a display that displays the plant state diagram generated by the generator as the information representing the state of the plant; and
a difference calculator that calculates the state value, wherein the state value is a difference between the plant information acquired through a network and a reference value.

21. The plant state displaying apparatus according to claim 20, further comprising:
a setter that sets a display condition for displaying the plant state diagram on the display, wherein the generator generates the plant state diagram according to the display condition set by the setter.

22. The plant state displaying apparatus according to claim 21, wherein
the setter sets a range of the plant state diagram to be displayed on the display as the display condition.

23. The plant state displaying apparatus according to claim 20, further comprising:
a storage,
wherein the generator stores the generated plant state diagram in the storage together with time information representing generation time, reads the plant state diagram stored in the storage based on instructions from an outside, and displays the read plant state diagram on the display based on the time information.

24. The plant state displaying apparatus according to claim 23, wherein
the generator performs animation display of the plant state diagrams read from the storage on the display in order of a time series.

25. The plant state displaying apparatus according to claim 23, wherein
the generator displays a plant state diagram represented with at least one of the color and the density of the at least one of devices, apparatuses, and facilities from which the plant information is acquired being changed according to magnitude of a numerical value calculated using the state value within a predetermined period.

26. A plant state displaying system displaying information representing a state of a plant, the plant state displaying system comprising:
a server apparatus that:
acquires plant information from at least one of devices, apparatuses, and facilities installed in the plant;
calculates a state value representing a change in the state of the plant using the plant information; and
generates a plant state diagram in which at least one of a color and a density of the at least one of devices, apparatuses, and facilities from which the plant information is acquired is changed according to magnitude of the state value; and
a display device that is connected to the server apparatus through a network and that displays the plant state diagram generated by the server apparatus as the information representing the state of the plant, wherein
the state value is calculated by the server as a difference between the plant information acquired through the network and a reference value.

27. A plant state displaying method displaying information representing a state of a plant, the plant state displaying method comprising:
acquiring plant information from at least one of devices, apparatuses, and facilities installed in the plant;
calculating a state value representing a change in the state of the plant using the plant information;
generating a plant state diagram in which at least one of a color and a density of the at least one of devices, apparatuses, and facilities from which the plant information is acquired is changed according to magnitude of the state value; and
displaying the generated plant state diagram as the information representing the state of the plant, wherein
the state value is calculated as a difference between the plant information acquired through a network and a reference value.

* * * * *